United States Patent
Tsuboi

(10) Patent No.: US 12,290,924 B2
(45) Date of Patent: May 6, 2025

(54) COORDINATE SYSTEM ALIGNMENT METHOD, ALIGNMENT SYSTEM, AND ALIGNMENT DEVICE FOR ROBOT

(71) Applicant: SICK K.K., Tokyo (JP)

(72) Inventor: Yusei Tsuboi, Tokyo (JP)

(73) Assignee: SICK K.K., Tokyo (JP)

( * ) Notice: Subject to any disclaimer, the term of this patent is extended or adjusted under 35 U.S.C. 154(b) by 317 days.

(21) Appl. No.: 17/781,141

(22) PCT Filed: Nov. 17, 2020

(86) PCT No.: PCT/JP2020/042870
§ 371 (c)(1),
(2) Date: May 31, 2022

(87) PCT Pub. No.: WO2021/111868
PCT Pub. Date: Jun. 10, 2021

(65) Prior Publication Data
US 2022/0410375 A1    Dec. 29, 2022

(30) Foreign Application Priority Data

Dec. 2, 2019   (JP) ................... 2019-217775

(51) Int. Cl.
*B25J 9/10*     (2006.01)
*G01B 11/26*    (2006.01)

(52) U.S. Cl.
CPC ............... *B25J 9/10* (2013.01); *G01B 11/26* (2013.01)

(58) Field of Classification Search
CPC .................................. B25J 9/10; G01B 11/26
See application file for complete search history.

(56) References Cited

U.S. PATENT DOCUMENTS

2016/0243703 A1    8/2016   Kovacs

FOREIGN PATENT DOCUMENTS

| EP | 1215017 A2 | 6/2002 |
| EP | 2722640 A1 | 4/2014 |

(Continued)

OTHER PUBLICATIONS

Nieves, et al., "A Reflected Laser Line Approach for Industrial Robot Calibration", International Conference on Advanced Intelligent Mechatronics, Jul. 2012.

*Primary Examiner* — Basil T. Jos
*Assistant Examiner* — Christopher A Buksa
(74) *Attorney, Agent, or Firm* — Nath, Goldberg & Meyer; Jerald L. Meyer; Morgan D. Rosenberg

(57) ABSTRACT

A device and method for aligning a robot coordinate system, being a coordinate system of a robot for moving an operating point three-dimensionally, and a measuring instrument coordinate system, being a coordinate system of a three-dimensional measuring instrument which is capable of executing a light sectioning method and of which a position and attitude with respect to the operating point are unchanging, characterized by including the steps of:
  determining a relationship between the coordinate systems;
  radiating sheet-like slit light from the three-dimensional measuring instrument onto a reference object in the shape of a rectangular cuboid which is fixed;
  finding the attitude of the three-dimensional measuring instrument relative to the reference object; and
  moving the three-dimensional measuring instrument such that the attitude of the three-dimensional measuring instrument falls within a predetermined standard attitude range.

15 Claims, 12 Drawing Sheets

(56) References Cited

FOREIGN PATENT DOCUMENTS

| | | |
|---|---|---|
| JP | H07239219 A | 9/1995 |
| JP | H08132373 A | 5/1996 |
| JP | 2010091540 A | 4/2010 |
| JP | 2019184340 A | 10/2019 |
| WO | 98/57782 A1 | 12/1998 |

[Figure 1]
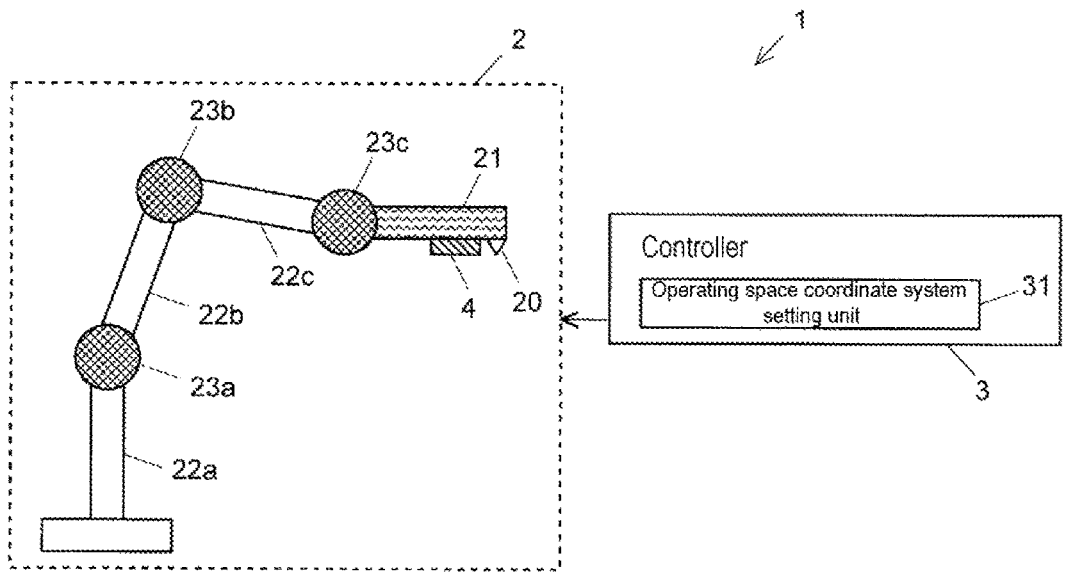
[Figure 2]
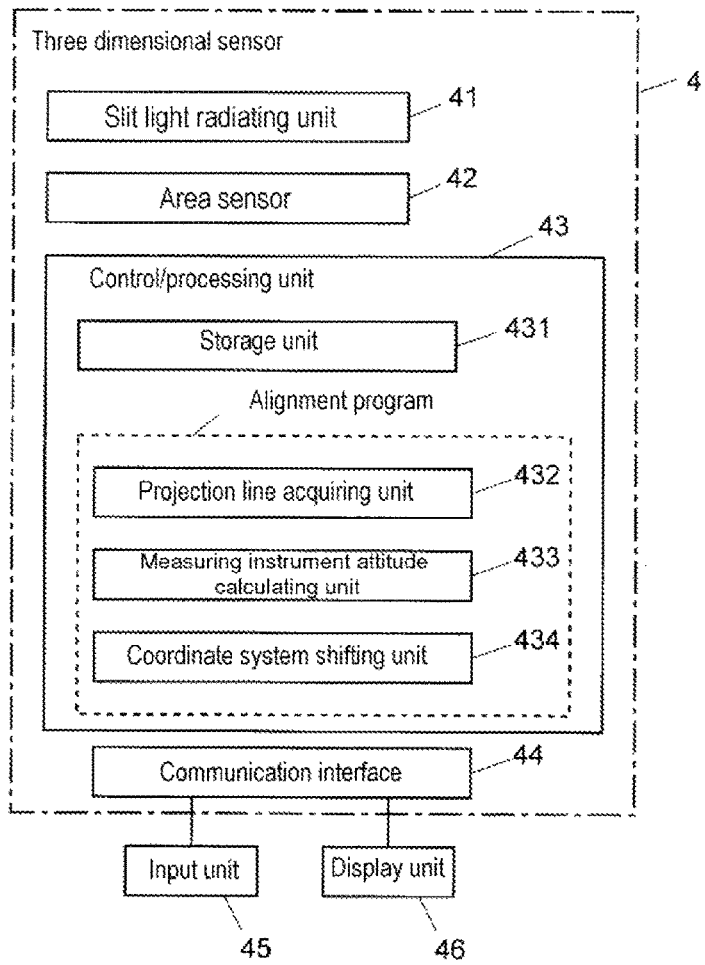

[Figure 3]
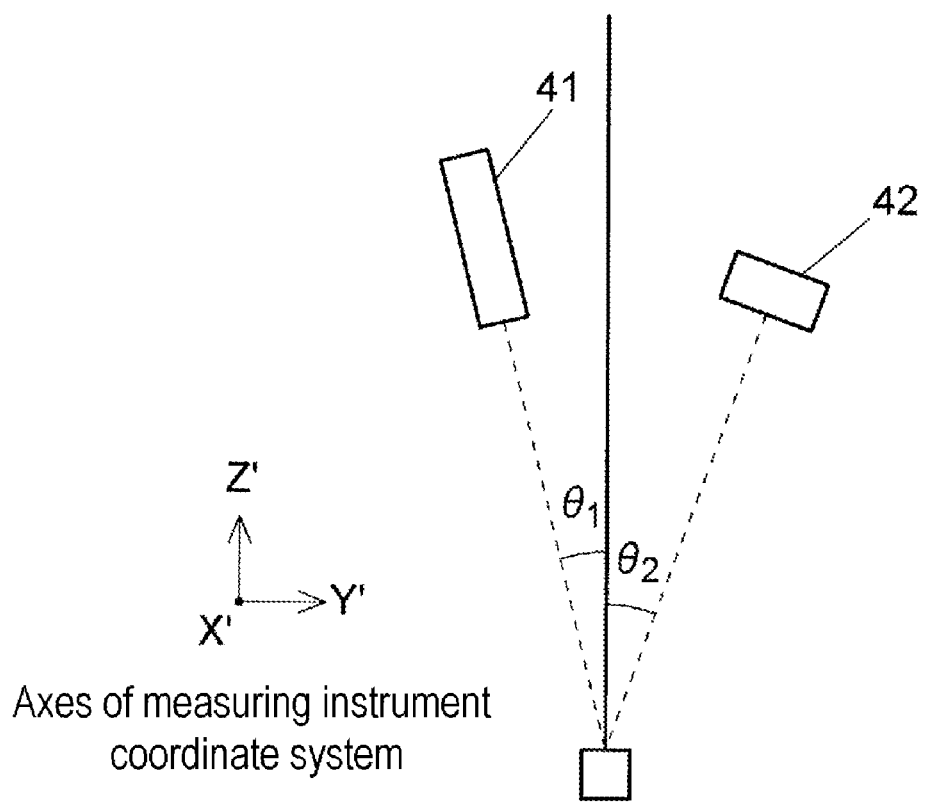
Axes of measuring instrument coordinate system

[Figure 4]
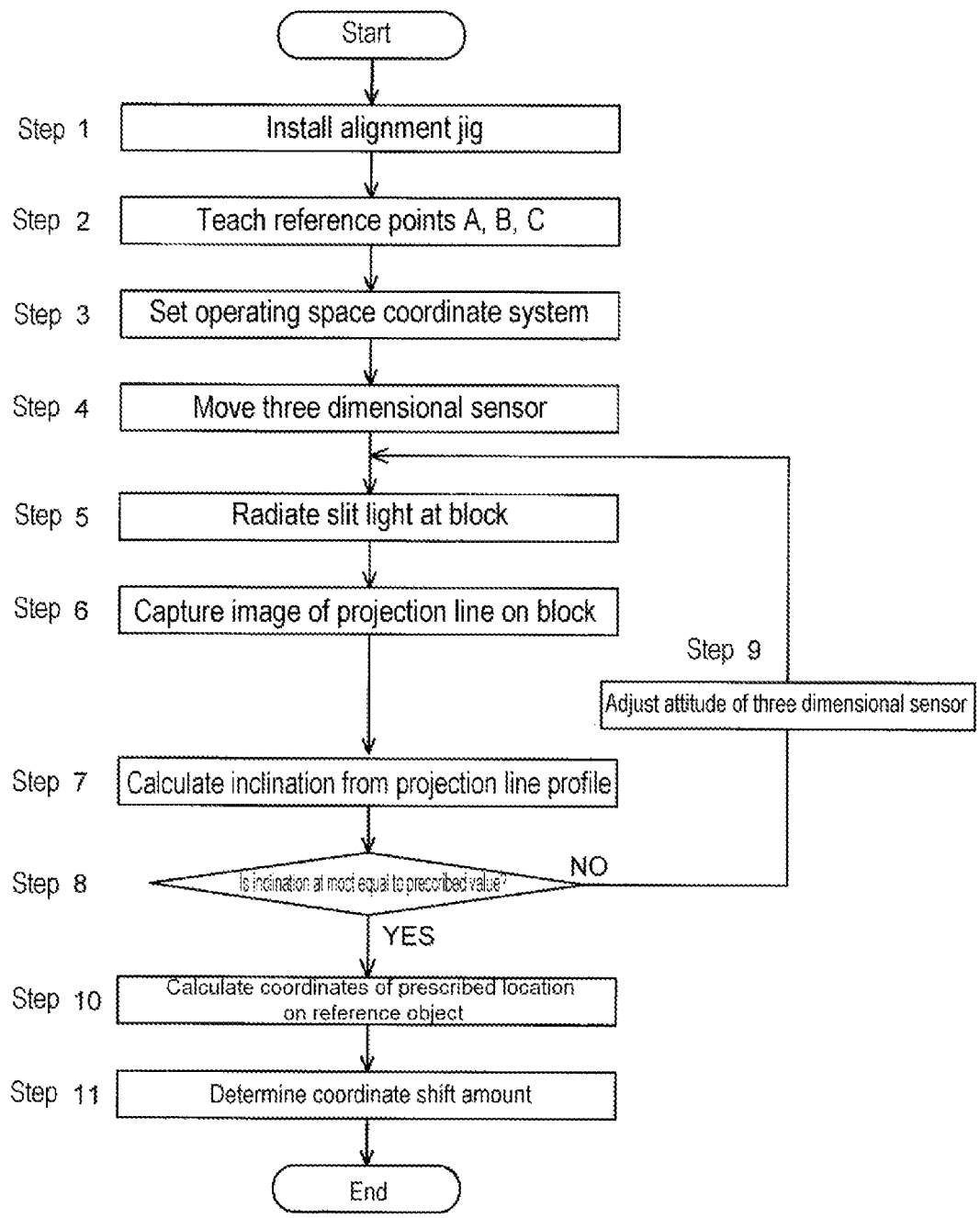

[Figure 5]
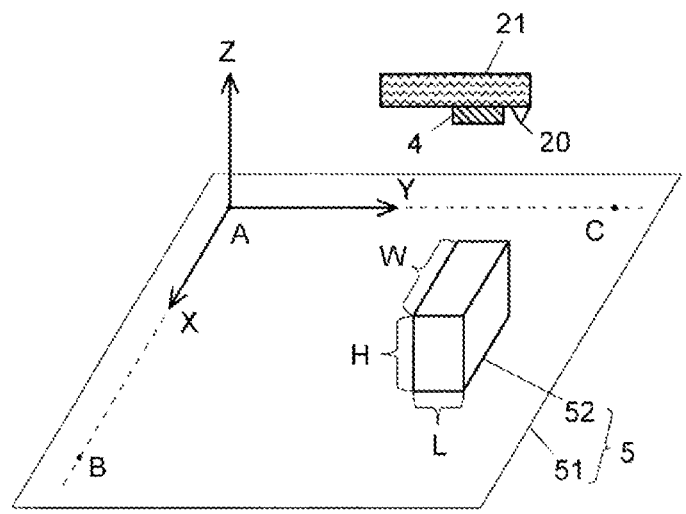
[Figure 6]
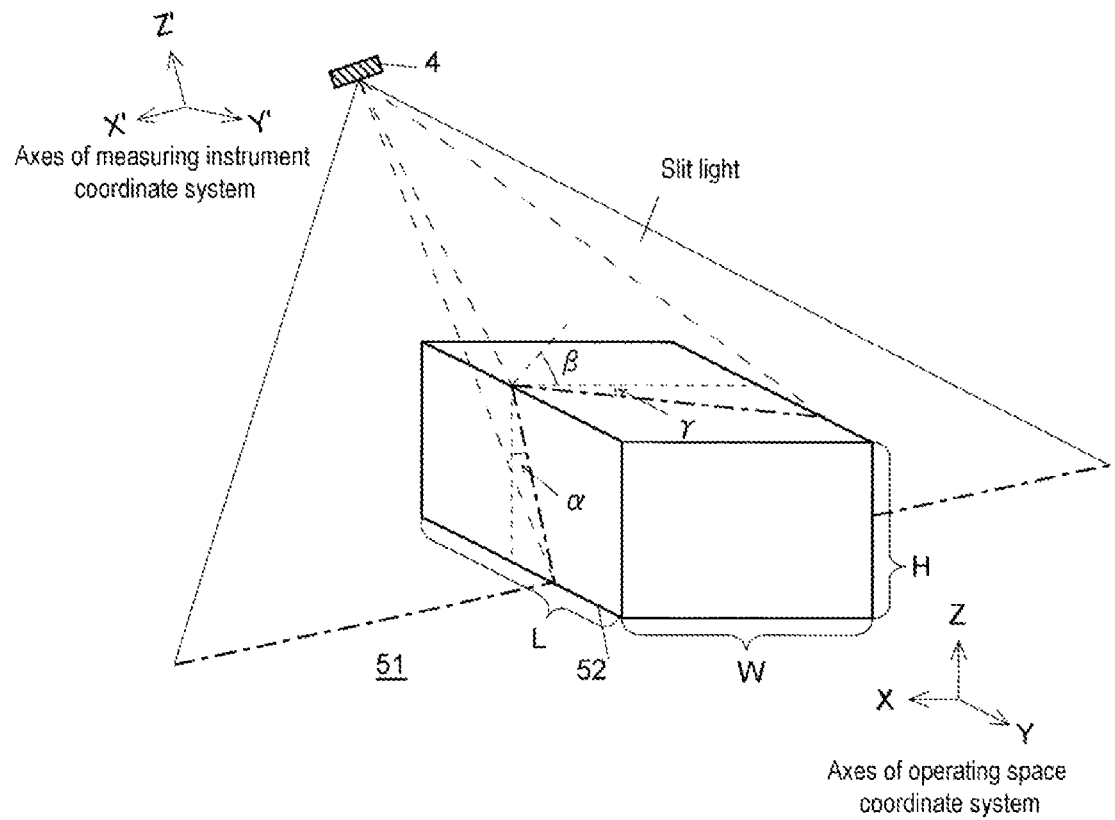

[Figure 7]
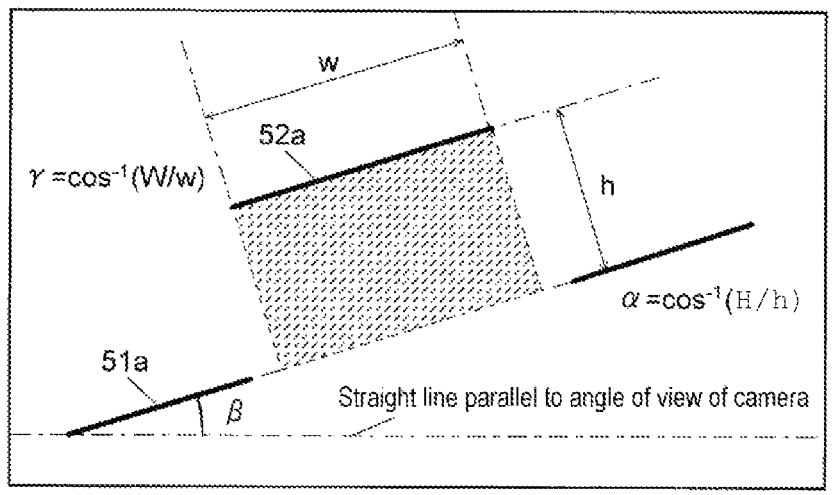
[Figure 8]
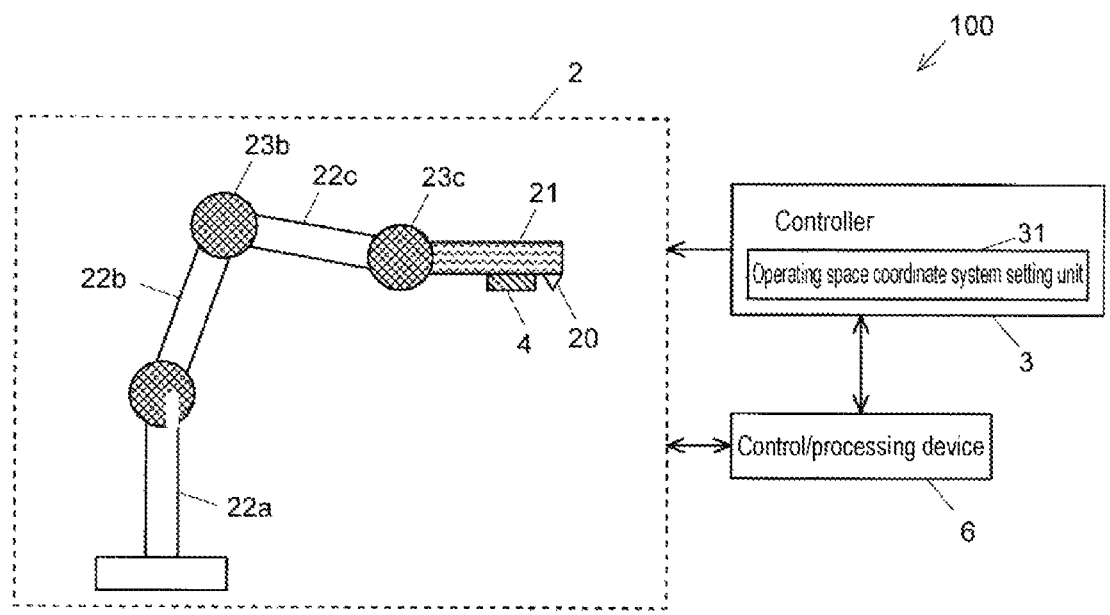

[Figure 9]
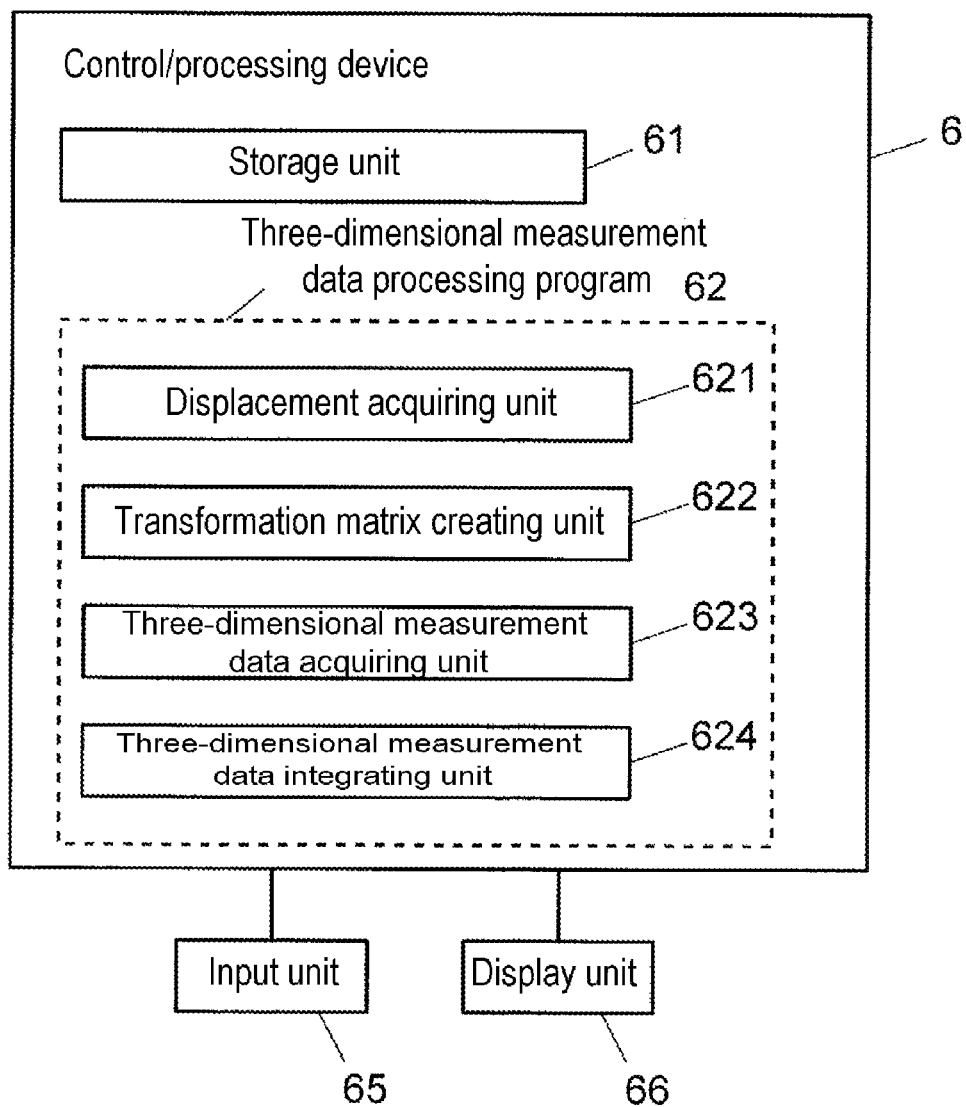

[Figure 10]
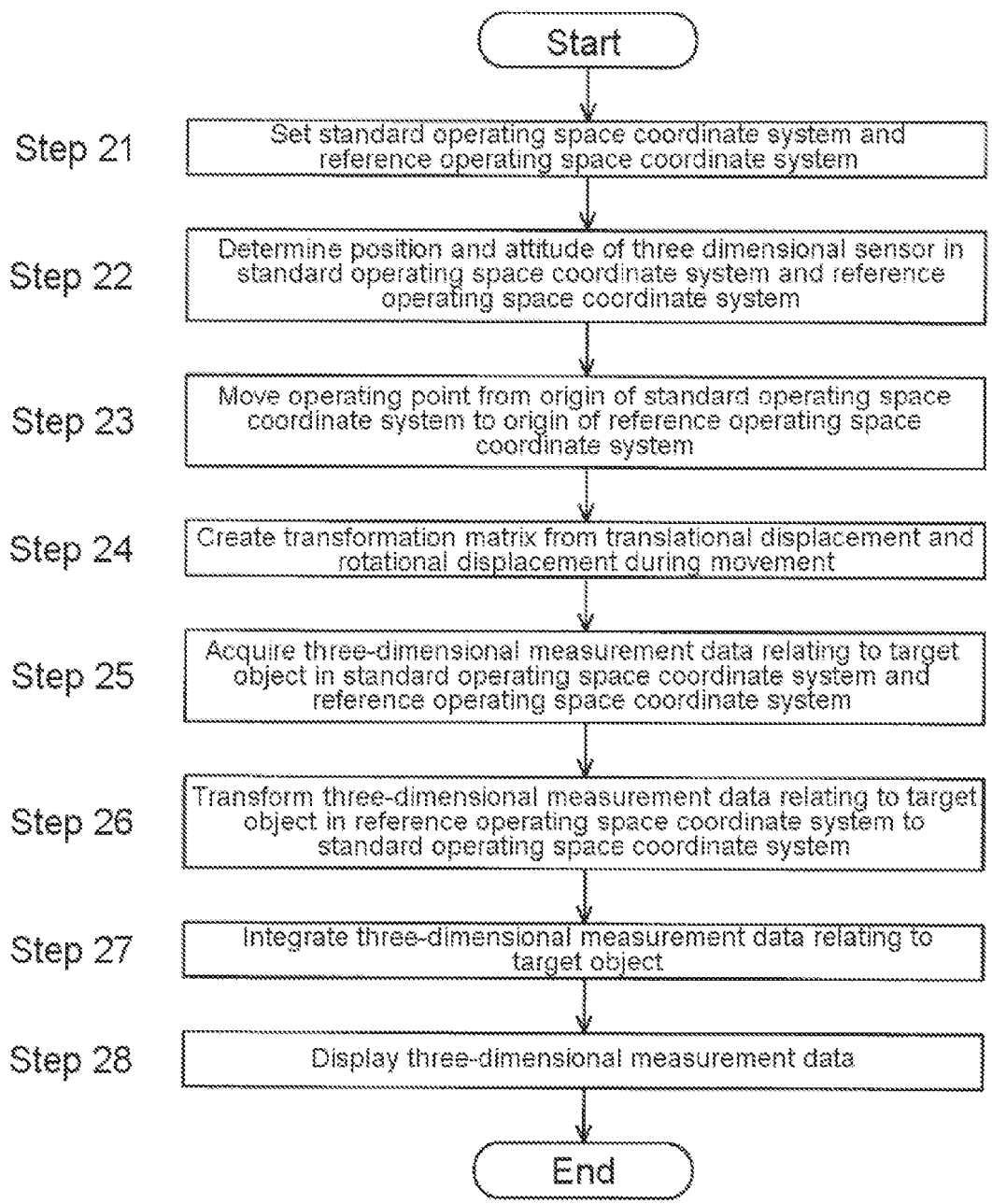

[Figure 11]
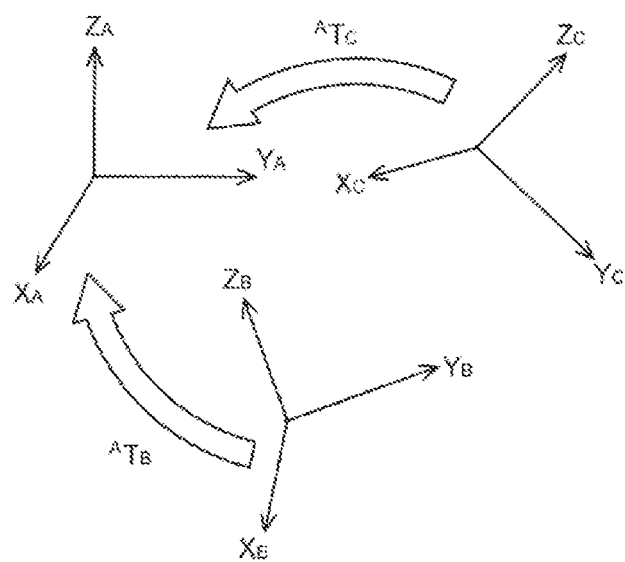

[Figure 12]
(a)
(b)
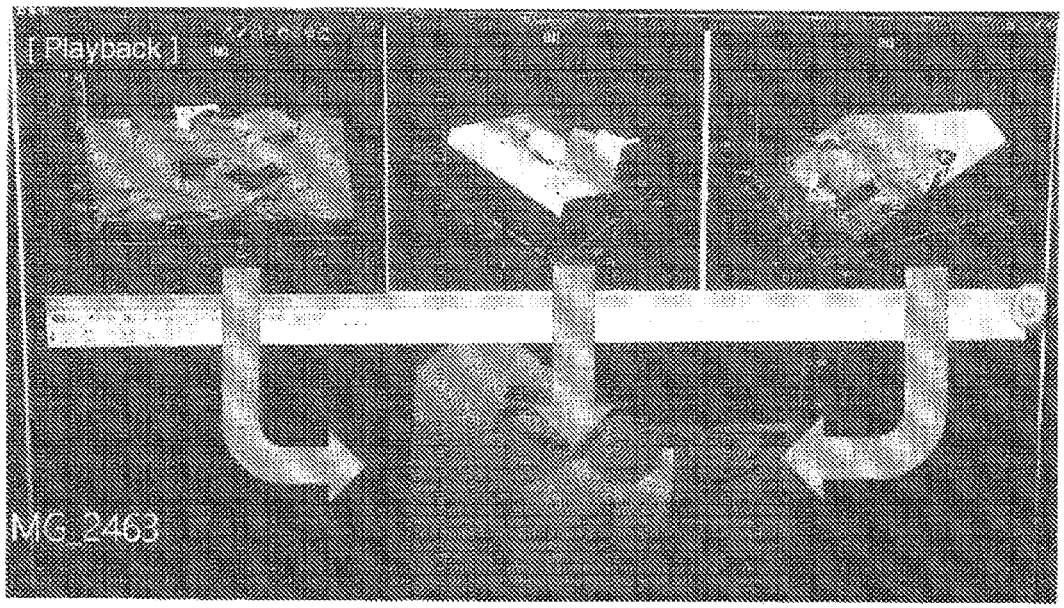

[Figure 13]
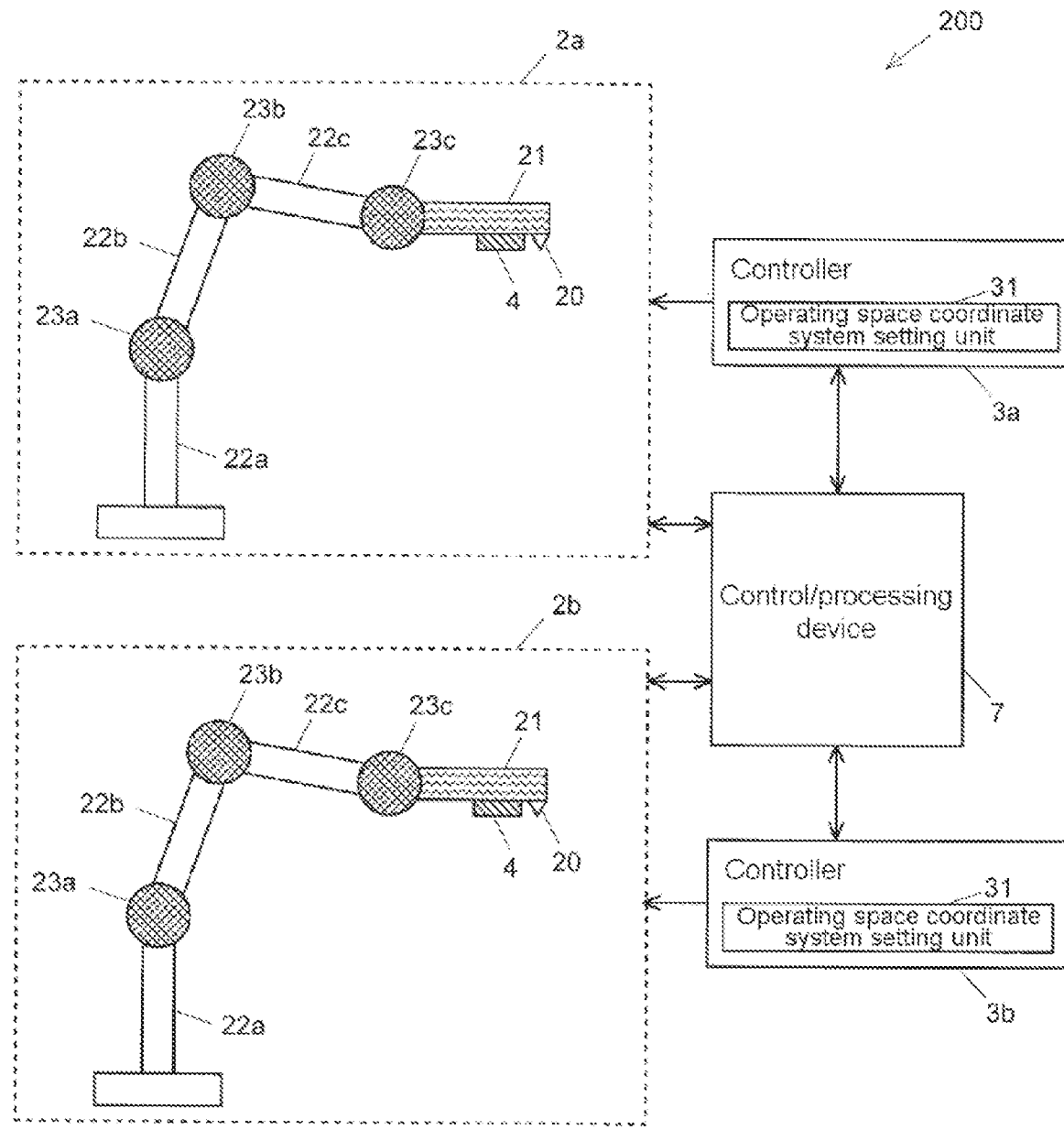

[Figure 14]
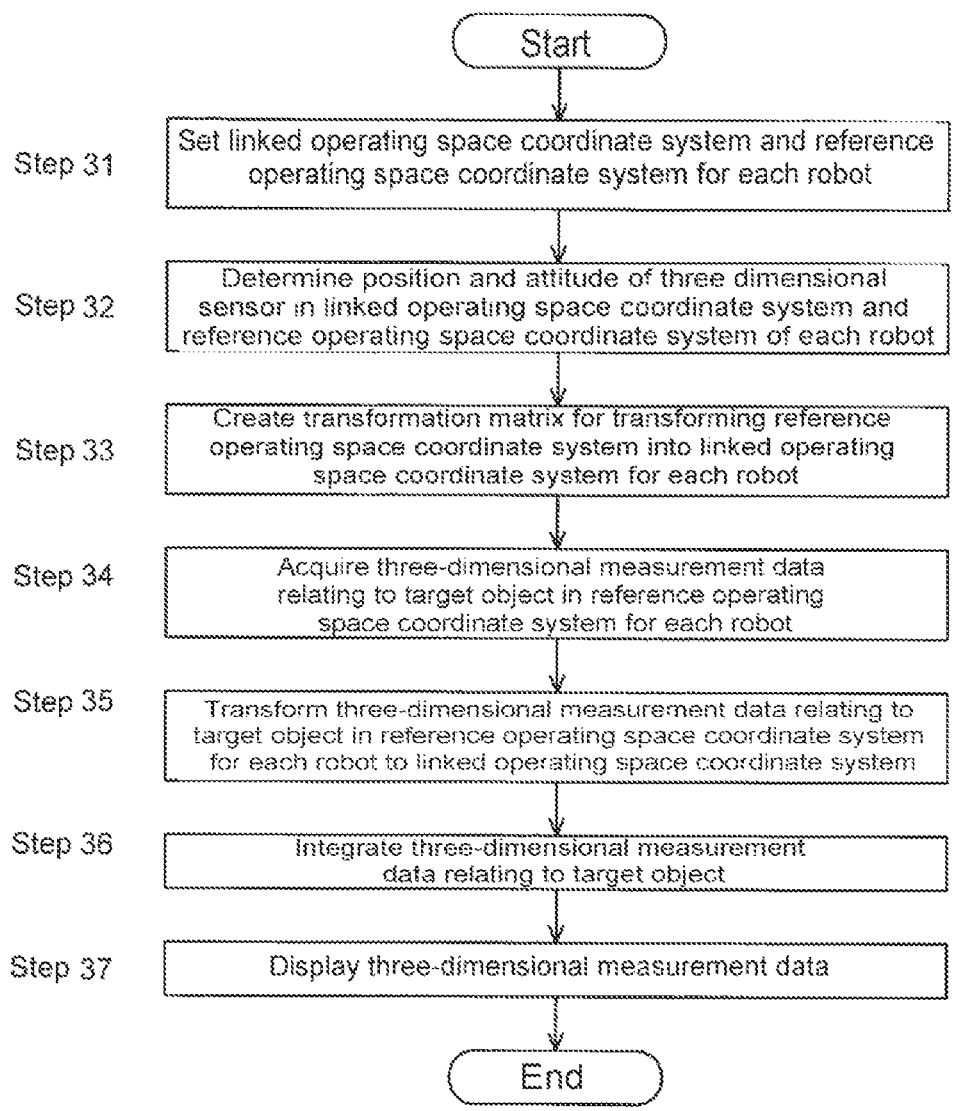

[Figure 15]
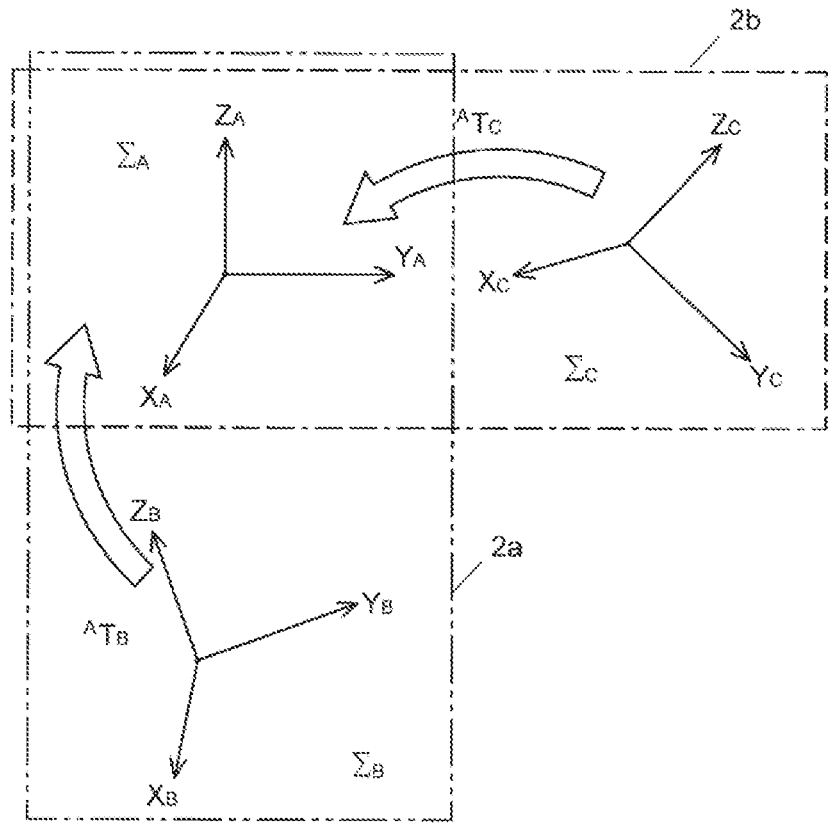
[Figure 16]
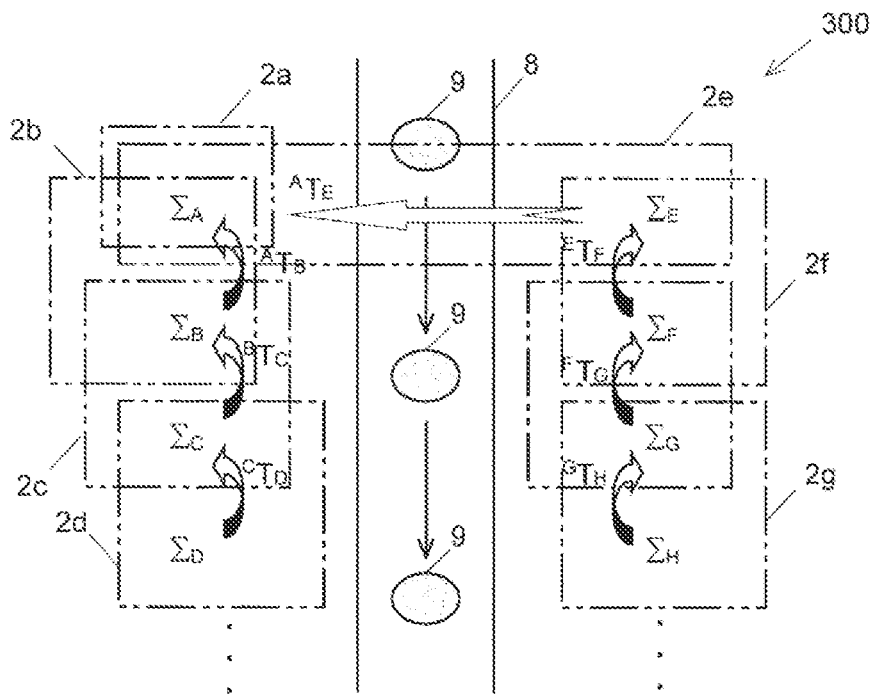

COORDINATE SYSTEM ALIGNMENT METHOD, ALIGNMENT SYSTEM, AND ALIGNMENT DEVICE FOR ROBOT

TECHNICAL FIELD

The present invention relates to a technology for aligning a coordinate system serving as a reference for controlling the operations of a robot that executes prescribed operations with respect to a target object, and a coordinate system of a three-dimensional measuring instrument that is used by being attached to the robot.

BACKGROUND ART

Industrial robots are used on factory production lines to enhance product assembly and processing efficiency. An industrial robot is provided with an arm having a tip end portion that is capable of moving three-dimensionally, and a jig which is attached to the tip end portion and which subjects an object being processed to predetermined processing. Further, a three-dimensional measuring instrument is attached to the tip end portion of the arm, and employs a light sectioning method, for example, to three-dimensionally measure the object being processed, and to determine the position and orientation thereof.

In an industrial robot, a coordinate system is set in advance by the manufacturer during manufacture, for example, and the operation of the arm is controlled on the basis of the coordinate system. Meanwhile, the three-dimensional measuring instrument outputs measurement results based on a coordinate system of the three-dimensional measuring instrument itself. Therefore, in order to move the jig to the position for processing the object being processed, of which the position and orientation have been identified by the three-dimensional measuring instrument, the coordinate system of the robot and the coordinate system of the three-dimensional measuring instrument must be made to coincide (also referred to as alignment or calibration).

Conventionally, an affine transformation employing a matrix operation has been used to align the two coordinate systems (for example patent literature article 1). In the alignment method disclosed in patent literature article 1, a three-dimensional measuring instrument attached to the tip end of an arm is moved to three positions not on the same straight line, the same part of a target object is measured at each position, and the coordinate values in the coordinate system of the three-dimensional measuring instrument are acquired. Then, matrices are created using the coordinate values in the coordinate system of the robot at the three positions and the coordinate values in the coordinate system of the three-dimensional measuring instrument acquired at each point, and a transformation matrix for transforming the three-dimensional measuring instrument coordinate system into the robot coordinate system is obtained by solving an equation obtained from the matrices.

PRIOR ART LITERATURE

Patent Literature

Patent literature article 1: Japanese Unexamined Patent Application Publication H8-132373
Patent literature article 2: Japanese Unexamined Patent Application Publication 2019-184340
Patent literature article 3: Japanese Unexamined Patent Application Publication H7-239219
Patent literature article 4: Japanese Unexamined Patent Application Publication 2010-91540

SUMMARY OF THE INVENTION

Problems to be Resolved by the Invention

With the alignment method disclosed in patent literature article 1, matrix equations corresponding to each of the three positions must be expanded and a complex equation solved in order to obtain the transformation matrix. Further, the development environment (development language) of a program for controlling the operation of the robot differs depending on the manufacturer. There has therefore been a problem in that it is difficult for alignment to be performed except by skilled workers capable of understanding various program languages and performing matrix operations.

The present invention addresses the problem of providing a technology with which it is possible for alignment of robot coordinate systems to be performed easily, even by a non-skilled worker.

Means for Solving the Problem

A first aspect of the present invention, made in order to overcome the abovementioned problems, provides a method for aligning a robot coordinate system, being a coordinate system of a robot for moving an operating point three-dimensionally, and a measuring instrument coordinate system, being a coordinate system of a three-dimensional measuring instrument which is capable of executing a light sectioning method and of which a position and attitude with respect to the operating point are unchanging, characterized by including the steps of:

determining a relationship between an operating space coordinate system, being a coordinate system of an operating space of the operating point, and the robot coordinate system, by moving the operating point to a first reference point positioned at an origin of the operating space coordinate system, and a second reference point and a third reference point positioned respectively on two straight lines that intersect at right angles at the first reference point, and teaching the position of each reference point;

radiating sheet-like slit light from the three-dimensional measuring instrument onto a reference object in the shape of a rectangular cuboid which is fixed, in such a way that the edges thereof are parallel to each of three orthogonal axes defining the operating space coordinate system, onto a surface of a plate-shaped member disposed parallel to a plane on which two of the three orthogonal axes are located, and acquiring a projection line on the reference object resulting from the slit light;

finding the attitude of the three-dimensional measuring instrument relative to the reference object on the basis of a profile of the projection line; and moving the three-dimensional measuring instrument such that the attitude of the three-dimensional measuring instrument falls within a predetermined standard attitude range.

Here, attitude means the inclination and orientation relative to a reference such as the axes of a coordinate system or a predetermined surface. Further, a three-dimensional measuring instrument capable of executing a light sectioning method is a measuring instrument capable of radiating slit light, having a known attitude relative to the measuring instrument coordinate system, onto a target object, acquiring data relating to a projection line on each surface of the target object resulting from the slit light, and acquiring information relating to the three-dimensional shape of the target object. Furthermore, the operating space is a space in which the operating point of the robot operates.

In the alignment method according to the first aspect of the present invention, first a relationship between the robot coordinate system and the operating space coordinate system is determined by moving the robot operating point to a first reference point positioned at the origin of the operating space coordinate system, and a second reference point and a third reference point positioned respectively on two straight lines that intersect at right angles at the first reference point, and teaching the position of each reference point. In other words, a first axis of the operating space coordinate system is defined by the first reference point and the second reference point, a second axis is defined by the first reference point and the third reference point, and a third axis is defined as an axis orthogonal to said two axes.

Next, slit light is radiated from the three-dimensional measuring instrument onto a reference object in the shape of a rectangular cuboid which is fixed, in such a way that the edges thereof are parallel to each of the three orthogonal axes defining the operating space coordinate system, onto a surface of a plate-shaped member parallel to a plane on which two of the three orthogonal axes are located, and a projection line on each surface of the reference object resulting from the slit light is acquired. Furthermore, the attitude of the three-dimensional measuring instrument relative to the reference object is found on the basis of the profile of the acquired projection lines. The projection line profile includes the length of the projection line on the upper surface of the reference object, the distance between the projection line on the upper surface of the reference object and the projection line on a surface of the plate-shaped member (the surface on which the reference object is placed), and the inclination of the projection lines relative to the coordinate axes of the three-dimensional measuring instrument. Furthermore, the three-dimensional measuring instrument is moved such that the attitude of the three-dimensional measuring instrument falls within a predetermined standard attitude range. A specific method for finding the attitude of the three-dimensional measuring instrument from the projection line profile will be discussed hereinafter.

Here, for ease of understanding, a specific example will be described for a case in which the reference object is arranged on a plane including two axes (defined as the X-axis and the Y-axis) of the operating space coordinate system in such a way as to also be parallel to the Z-axis, the sheet-like slit light has a width in the measuring instrument coordinate system X'-axis direction and is radiated in the Z'-axis direction, and the standard attitude range is set such that the attitude of the three-dimensional measuring instrument is substantially parallel to the reference object (that is, in this example the three axes of the robot coordinate system and the measuring instrument coordinate system are substantially parallel to one another). At this time, if the three axes of the measuring instrument coordinate system are parallel to the three axes of the operating space coordinate system (and therefore also parallel to three edges of the reference object), the length of the slit light radiated onto the upper surface of the reference object matches the width of the upper surface of the reference object. Further, the distance between the projection line on the upper surface of the reference object and the projection line on the surface of the plate-shaped member (the surface on which the reference object is placed) is a prescribed value based on the height of the reference object. Furthermore, these projection lines are parallel to the X'-axis of the three-dimensional measuring instrument.

Meanwhile, the length of the slit light radiated onto the upper surface of the reference object increases with increasing rotation of the measuring instrument coordinate system about the Z-axis of the operating space coordinate system. Further, if the measuring instrument coordinate system is inclined about one axis (defined to be the Y-axis) within said plane relative to the operating space coordinate system, the inclinations of the projection line on the upper surface of the reference object and the projection line on the surface of the plate-shaped member (the surface to which the reference object is fixed) relative to the X'-axis of the three-dimensional measuring instrument increases. Further, a section line obtained by radiating the slit light may appear on the side surface of the reference object. Further, the greater the inclination of the measuring instrument coordinate system relative to the operating space coordinate system about another axis in the horizontal direction (defined to be the X-axis), the greater the distance between the projection line on the upper surface of the reference object and the projection line on the surface of the plate-shaped member. Therefore, the attitude of the three-dimensional measuring instrument relative to the reference object (in this example, the inclination of the measuring instrument coordinate system axes relative to each of the three axes of the operating space coordinate system) is found from these items of information.

Then, if any of the inclinations are greater than a predetermined threshold, the three-dimensional measuring instrument is moved such that all of the inclinations fall below said threshold. This can, for example, be carried out by the user operating a controller while viewing the attitude of the three-dimensional measuring instrument relative to the reference object, to move the three-dimensional measuring instrument to become parallel to the reference object, and confirming that all of the inclinations fall below the threshold in the resulting position. As a result, the attitude of the three-dimensional measuring instrument can be made to fall within the standard attitude range (in this example, such that the directions in which the three edges of the reference object extend are parallel to the three axes of the measuring instrument coordinate system).

As described hereinabove, in the alignment method according to the first aspect of the present invention, since it is not necessary to perform a matrix operation employing programming language, alignment of the robot coordinate system can be carried out easily, even by a non-skilled worker.

In this alignment method, the attitude of the three-dimensional measuring instrument is set in such a way that a predetermined standard attitude is adopted relative to the rectangular cuboid shaped reference object, which is arranged in such a way that the edges thereof are respectively parallel to the three orthogonal axes of one operating space coordinate system, for example, and three-dimensional measurement of the target object is performed with said position and attitude. In other words, in this alignment method, one position and attitude of the three-dimensional measuring instrument are set with respect to one operating space coordinate system, and the three-dimensional measurement data of the target object are acquired with said position and attitude. In many cases, target objects that are assembled or machined on a production line of a factory or the like have a three-dimensional shape, and there if the three-dimensional measurement data of the target object are only acquired using one position and attitude, there will be parts in shadow, and it will not be possible to obtain shape information relating to the target object for said parts. Accordingly, it is required to acquire the shape information relating to the target object from a plurality of directions.

Accordingly, in an alignment method according to a second aspect of the present invention, it is preferable to configure the first aspect such that:

a standard operating space coordinate system and a reference operating space coordinate system are set as the operating space coordinate system;

the operating point is moved between an origin of the standard operating space coordinate system and an origin of the reference operating space coordinate system, and a translational displacement and a rotational displacement are acquired;

a transformation matrix for transforming the reference operating space coordinate system into the standard operating space coordinate system is found on the basis of the translational displacement and the rotational displacement;

the three-dimensional measuring instrument is moved in such a way that the attitude of the three-dimensional measuring instrument falls within the predetermined standard attitude range in each of the standard operating space coordinate system and the reference operating space coordinate system, and three-dimensional measurement data relating to a target object are acquired; and the transformation matrix is employed to transform the three-dimensional measurement data relating to the target object, acquired in the reference operating space coordinate system, into three-dimensional measurement data in the standard operating space coordinate system, and said three-dimensional measurement data are integrated with the three-dimensional measurement data relating to the target object, acquired in said standard operating space coordinate system.

In the alignment method according to the second aspect, a standard operating space coordinate system and a reference operating space coordinate system are set. Then, the robot operating point is moved between the origins of the two coordinate systems, the translational displacement and rotational displacement result from said movement are acquired, and a transformation matrix for transforming the reference operating space coordinate system into the standard operating space coordinate system is found on the basis of the displacements. Three-dimensional measurement data relating to the target object are then acquired by means of the three-dimensional measuring instrument using each of the standard operating space coordinate system and the reference operating space coordinate system, and the transformation matrix is then employed to transform and integrate the three-dimensional measurement data acquired using the reference operating space coordinate system into three-dimensional measurement data in the standard operating space coordinate system. In the alignment method according to this aspect, the target object is measured three-dimensionally with a plurality of positions and attitudes, making it possible to obtain shape information relating to the target object with no parts in shadow.

The range of movement of the robot operating point is determined by the length of the arm, and if the target object is large with respect to the robot, the arm may not reach the opposite side of the target object using only one robot, so it may not be possible to acquire the three-dimensional measurement data for a portion of the target object.

Accordingly, in an alignment method according to a third aspect of the present invention, the second aspect should be configured such that:

a plurality of said operating space coordinate systems, of which one is common with the operating space coordinate system set for at least one other robot, are set for each of a plurality of robots;

one of all the operating space coordinate systems set for the plurality of robots is defined as the standard operating space coordinate system, and the others are defined as reference operating space coordinate systems;

the transformation matrix for transforming the reference operating space coordinate systems into the standard operating space coordinate system, among the coordinate systems set for the plurality of robots, is created;

the three-dimensional measurement data relating to the target object are acquired in each of the plurality of operating space coordinate systems set for each of the plurality of robots; and the three-dimensional measurement data relating to the target object, acquired in the reference operating space coordinate systems, are transformed into three-dimensional measurement data in the standard operating space coordinate system, and are integrated.

In the alignment method according to the third aspect, since the three-dimensional measurement data relating to the target object are acquired using a plurality of robots, there are no parts in shadow, even if the target object is larger than the robots, and three-dimensional shape information can be obtained.

A fourth aspect of the present invention, made in order to overcome the abovementioned problems, provides a system for aligning a robot coordinate system, being a coordinate system of a robot for moving an operating point three-dimensionally, and a measuring instrument coordinate system, being a coordinate system of a three-dimensional measuring instrument which is capable of executing a light sectioning method and of which a position and attitude with respect to the operating point are unchanging, characterized by being provided with:

an operating space coordinate system setting unit for determining a relationship between an operating space coordinate system, being a coordinate system of an operating space of the operating point, and the robot coordinate system, by moving the operating point to a first reference point positioned at an origin of the operating space coordinate system, and a second reference point and a third reference point positioned respectively on two straight lines that intersect at right angles at the first reference point, and teaching the position of each reference point;

a projection line acquiring unit for radiating sheet-like slit light from the three-dimensional measuring instrument onto a reference object in the shape of a rectangular cuboid which is fixed, in such a way that the edges thereof are parallel to each of three orthogonal axes defining the operating space coordinate system, onto a surface of a plate-shaped member disposed parallel to a plane on which two of the three orthogonal axes are located, and acquiring a projection line on the reference object resulting from the slit light;

a measuring instrument attitude calculating unit for finding the attitude of the three-dimensional measuring instrument relative to the reference object on the basis of a profile of the projection line; and a measuring instrument moving unit for moving the three-dimensional measuring instrument.

In an alignment system according to a fifth aspect of the present invention, the operating space coordinate system sets a standard operating space coordinate system and a reference operating space coordinate system as the operating space coordinate system, and the alignment system can additionally be provided with:

a displacement acquiring unit for moving the operating point between an origin of the standard operating space coordinate system and an origin of the reference operating space coordinate system, and acquiring a translational displacement and a rotational displacement;

a transformation matrix calculating unit for finding, on the basis of the translational displacement and the rotational displacement, a transformation matrix for transforming the reference operating space coordinate system into the standard operating space coordinate system;

a three-dimensional measurement data acquiring unit for moving the three-dimensional measuring instrument in such a way that the attitude of the three-dimensional measuring instrument falls within the predetermined standard attitude range in each of the standard operating space coordinate system and the reference operating space coordinate system, and acquiring three-dimensional measurement data relating to a target object; and a three-dimensional measurement data integrating unit for employing the transformation matrix to transform the three-dimensional measurement data relating to the target object, acquired in the reference operating space coordinate system, into three-dimensional measurement data in the standard operating space coordinate system, and integrating said three-dimensional measurement data with the three-dimensional measurement data relating to the target object, acquired in said standard operating space coordinate system.

Further, in an alignment system according to a sixth aspect of the present invention, the fifth aspect can additionally be provided with a plurality of robots, wherein:

the operating space coordinate system setting unit sets a plurality of said operating space coordinate systems, of which one is common with the operating space coordinate system set for at least one other robot, for each of the plurality of robots, sets one of all the operating space coordinate systems set for the plurality of robots as the standard operating space coordinate system, and sets the others as reference operating space coordinate systems;

the transformation matrix calculating unit creates the transformation matrices for transforming the reference operating space coordinate systems into the standard operating space coordinate system, among the coordinate systems set for the plurality of robots;

the three-dimensional measurement data integrating unit acquires the three-dimensional measurement data relating to the target object in each of the plurality of operating space coordinate systems set for each of the plurality of robots; and the three-dimensional measurement data integrating unit transforms the three-dimensional measurement data relating to the target object, acquired in the reference operating space coordinate systems, into three-dimensional measurement data in the standard operating space coordinate system, and integrates the same.

A seventh aspect of the present invention, made in order to overcome the abovementioned problems, provides a device used to align an operating space coordinate system, being a coordinate system of an operating space of an operating point associated in advance with a robot coordinate system, being a coordinate system of a robot for moving the operating point three-dimensionally, and a measuring instrument coordinate system, being a coordinate system of a three-dimensional measuring instrument which is capable of executing a light sectioning method and of which a position and attitude with respect to the operating point are unchanging, characterized by being provided with:

a projection line acquiring unit for radiating sheet-like slit light from the three-dimensional measuring instrument onto a reference object in the shape of a rectangular cuboid which is fixed, in such a way that the edges thereof are parallel to each of three orthogonal axes defining the operating space coordinate system, onto a surface of a plate-shaped member disposed parallel to a plane on which two of the three orthogonal axes are located, and acquiring a projection line on the reference object resulting from the slit light; and a measuring instrument attitude calculating unit for finding the attitude of the three-dimensional measuring instrument relative to the reference object on the basis of a profile of the projection line.

Advantages of the Invention

By employing the robot coordinate system alignment method, alignment system, or alignment device according to the present invention, alignment of a robot coordinate system can be performed easily, even by a non-skilled worker.

BRIEF EXPLANATION OF THE DRAWINGS

FIG. 1 is an outline configuration diagram of a robot system including a first exemplary embodiment of a robot coordinate system alignment device and alignment system according to the present invention.

FIG. 2 is a drawing used to describe the configuration of a three-dimensional sensor in the first exemplary embodiment.

FIG. 3 is a drawing used to explain the arrangement of a slit light radiating unit and an area sensor of the three-dimensional sensor.

FIG. 4 is a flowchart relating to a first exemplary embodiment of a robot coordinate system alignment method according to the present invention.

FIG. 5 is a drawing used to describe an alignment jig used in the first exemplary embodiment.

FIG. 6 is a drawing used to describe projection lines on a block resulting from slit light in the first exemplary embodiment.

FIG. 7 illustrates an example of the profile of a projection line obtained in the first exemplary embodiment.

FIG. 8 is an outline configuration diagram of a robot system including a second exemplary embodiment of a robot coordinate system alignment device and alignment system according to the present invention.

FIG. 9 is a drawing used to describe the configuration of a control/processing unit in the robot system in the second exemplary embodiment.

FIG. 10 is a flowchart relating to a second exemplary embodiment of a robot coordinate system alignment method according to the present invention.

FIG. 11 is a drawing used to describe the relationship between the operating space coordinate systems in the second exemplary embodiment.

FIG. 12 illustrates the result of integrating three-dimensional measurement data relating to a target object using the robot system in the second exemplary embodiment.

FIG. 13 is an outline configuration diagram of a robot system including a third exemplary embodiment of a robot coordinate system alignment device and alignment system according to the present invention.

FIG. 14 is a flowchart relating to a third exemplary embodiment of a robot coordinate system alignment method according to the present invention.

FIG. 15 is a drawing used to describe the relationship between the operating space coordinate systems in the third exemplary embodiment.

FIG. 16 is a drawing used to describe the relationship between the robot arrangement and the operating space coordinate systems in the third exemplary embodiment.

MODES OF EMBODYING THE INVENTION

First Exemplary Embodiment

A first exemplary embodiment of a robot coordinate system alignment method, alignment system, and alignment device according to the present invention will now be described with reference to the drawings. FIG. 1 is a configuration diagram of the main parts of a robot system 1 including a robot coordinate system alignment system and device (referred to as 'alignment system' and 'alignment device' hereinbelow.) according to the present invention.

The robot system 1 in the first exemplary embodiment is provided with a robot 2, and a controller 3 for operating the robot 2.

The robot 2 is provided with an arm unit 21 which is provided at the tip end with an operating point 20, and linear motion mechanisms 22a to 22c and rotation mechanisms 23a to 23c for moving the arm unit 21 three-dimensionally. The linear motion mechanisms 22a to 22c and the rotation mechanisms 23a to 23c operate under the control of the controller 3. The controller 3 includes, as a functional block, an operating space coordinate system setting unit 31 for determining a relationship between an operating space coordinate system and a robot coordinate system by means of teaching, discussed hereinafter.

A three-dimensional sensor 4 is detachably attached in the vicinity of the operating point 20 of the arm unit 21. As illustrated in FIG. 2, the three-dimensional sensor 4 is provided with a slit light radiating unit 41 for radiating slit light onto a target object, and an area sensor 42 for capturing an image of a projection line of the slit light on the target object. A measuring instrument coordinate system is defined for the same, and, as illustrated in FIG. 3, the light radiating unit 41 is disposed inclined at an angle $\theta_1$ with respect to the X'-Z' plane of the measuring instrument coordinate system, and the area sensor 42 is disposed inclined at an angle $\theta_2$ with respect to said plane, on the opposite side of the X'-Z' plane to the slit light radiating unit 41. $\theta_1$ is 0 in the first exemplary embodiment, but this is not an essential requirement for the present invention, and provided that the angle $\theta_1$ is known, it is possible to ascertain how the projection line on the target object will be captured by the area sensor 42. Therefore, the processing described hereinafter can be performed by means of appropriate arithmetic processing based on the known angle.

In the first exemplary embodiment, the slit light radiating unit 41 is arranged on the X'-Z' plane, and slit light is radiated onto the target object (slit light having a width in the X'-axis direction is radiated in the Z'-axis direction) along the X'-Z' plane. $\theta_2$ is set to an appropriate angle within a range of 30° to 40°, for example. The three-dimensional sensor 4 employed in the first exemplary embodiment is one which corrects aberrations caused by the lenses included in the optical system of the sensor 4, and depth aberration (aberration resulting from perspective within the angle of view when the camera is oriented in an oblique direction). As a result, accurate measurement is performed in the light sectioning method discussed hereinafter, and the coordinate system alignment accuracy is improved.

The three-dimensional sensor 4 is additionally provided with a control/processing unit 43. The control/processing unit 43 is provided with a storage unit 431, and also, as functional blocks, with a projection line acquiring unit 432, a measuring instrument attitude calculating unit 433, and a coordinate system shifting unit 434. The control/processing unit 43 in the first exemplary embodiment is configured as an arithmetic processing mechanism which is incorporated inside the three-dimensional sensor 4. Further, the control/processing unit 43 is connected by way of a prescribed communication interface 44 to an input unit 45 for a user to give appropriate input instructions, and a display unit 46 for displaying measurement results and the like. The control/processing unit 43 can also be provided separately from the three-dimensional sensor 4, configured as a portable terminal or the like that is configured to be capable of communicating with the three-dimensional sensor 4.

The procedure of the alignment method in the first exemplary embodiment will next be described with reference to the flowchart in FIG. 4.

First, an alignment jig is prepared. The alignment jig 5 includes a plate-shaped member 51, and a block 52 which is fixed onto the plate-shaped member 51. As illustrated in FIG. 5, the plate-shaped member 51 is fixed with the upper surface thereof coinciding with a plane including two axes (X and Y-axis) of the operating space coordinate system, which is the coordinate system of a space in which the operating point 20 of the robot 2 is operated. Further, a reference point A is set to a position on the upper surface of the plate-shaped member 51 corresponding to the origin of the operating space coordinate system, a reference point B is set to a prescribed position on the X-axis of the operating space coordinate system, and a reference point C is set to a prescribed position on the Y-axis of the operating space coordinate system. That is, the X-axis direction of the operating space coordinate system is defined by the reference points A and B, and the Y-axis of the operating space coordinate system is defined by the reference points A and C.

The size of the block 52 is a length W (mm) in the X-axis direction, a length L (mm) in the Y-axis direction, and a length H (mm) in the Z-axis direction. The length of the block 52 in the X-axis direction is preferably as long as possible within a range lying within the field of view of the area sensor 42. This increases the length of the slit light projection line projected onto the upper surface of the block 52 when the processing discussed hereinafter is performed, thereby improving the accuracy when the attitude of the three-dimensional sensor 4 with respect to the block 52 is obtained.

Meanwhile, the length of the block 52 in the Y-axis direction is 10 to 100 mm, for example, and should be determined as appropriate in consideration of the size of the robot, for example. Increasing the length of the block 52 in the Y-axis direction makes it easier to visually recognize whether the slit light projection line is parallel to one edge (the edge parallel to the X-axis of the operating space coordinate system) of the block 52 when the slit light is radiated onto the block 52. If the block 52 is too short in the Y-axis direction, the slit light projection line crosses one edge (the edge parallel to the X-axis of the operating space coordinate system) of the block 52, and it is difficult to obtain a projection line that traverses the upper surface of the block 52.

In a conventional coordinate system alignment method, a jig having a tip end that is as sharp as possible is used in order to position the operating point accurately, but diffuse reflection of light is liable to occur if a jig having a sharp tip end is used, and in some cases it has been difficult to capture an image when checking the positional relationship between the operating point and the tip end of the jig. In contrast, diffuse reflection does not occur in the first exemplary embodiment, since it is not necessary to use a jig having a sharp tip end in order to carry out the coordinate system alignment by means of the method and device discussed hereinafter, and it is sufficient to use the rectangular cuboid block 52, and thus an image of the projection line or the like discussed hereinafter is captured easily and accurately.

Further, the surface of the block 52 is subjected to matte treatment to suppress diffused reflection of light. A block made from matte alumite, for example, can preferably be used as the block 52. The block 52 is arranged parallel to the three axes of the operating space coordinate system in such a way that the center of the bottom surface of the block 52 is positioned at predetermined coordinates in the operating space coordinate system. The alignment jig is thus installed (step 1. See FIG. 5).

Next, the arm unit 21 is moved by the controller 3 to move the operating point 20 to the reference point A, and the robot 2 is taught the position of the reference point A. Similarly, the operating point 20 is moved to the reference points B and C, and the positions thereof are taught to the robot 2 (step 2). At this time, the user may manipulate the controller 3 by him or herself, or the operating point 20 may be moved to each reference point by the operating space coordinate system setting unit 31. The operating space coordinate system setting unit 31 then registers, in the robot 2, the coordinates of the reference points A, B, and C in the operating space coordinate system, and determines the relationship between the robot coordinate system that has been registered in the robot 2 in advance (for example at the time of shipment) and the operating space coordinate system. The operating space coordinate system is thus set in the robot 2 (step 3).

After the operating space coordinate system has been set in the robot 2, the arm unit 21 is moved by the controller 3 to position the three-dimensional sensor 4 above the block 52, as illustrated in FIG. 5 (step 4). In FIG. 5, depictions of parts of the robot 2 other than the arm unit 21 are omitted. Next, slit light is radiated from the slit light radiating unit 41 onto the block 52 (step 5), and the projection line on the block 52 is acquired by the area sensor 42 (step 6).

The slit light in the first exemplary embodiment is light having a width in the direction of one axis (X'-axis) of the measuring instrument coordinate system, serving as a reference for an output signal from the three-dimensional sensor 4, and is emitted in the direction of another axis (Z'-axis) of the measuring instrument coordinate system. In other words, the light is sheet-like slit light along the X'-Z' plane of the measuring instrument coordinate system (see FIG. 6). The three-dimensional sensor 4 in the first exemplary embodiment corrects aberrations caused by the lenses included in the optical system of the sensor 4, and depth aberration (aberration resulting from perspective within the angle of view when the camera is oriented in an oblique direction). More specifically, the position in which the slit light is incident on pixels arranged two-dimensionally is identified, and the position thereof is then corrected by calibration. The projection line profile is then acquired from the corrected pixel positions.

As discussed hereinabove, three edges of the block 52 are arranged parallel to the three axes of the operating space coordinate system, and the slit light is sheet-like like along the X'-Z' plane. Therefore, if the X-axis, the Y-axis, and the Z-axis of the operating space coordinate system are respectively parallel to the X'-axis, the Y'-axis, and the Z'-axis of the measuring instrument coordinate system, the projection line on the upper surface of the block 52 has the same length W as one edge of the block 52 that is parallel to the X-axis. Further, the distance between the projection line on the upper surface of the block 52 and the projection line on the plate-shaped member 51 depends on the height H of the block 52 (and the angle at which the area sensor 42 of the three-dimensional sensor 4 captures the block and the plate-shaped member 51).

Meanwhile, if the measuring instrument coordinate system is inclined relative to the operating space coordinate system, a projection line having a length and distance that are different from those described hereinabove appears. The projection line that appears in such a case will be described with reference to FIGS. 6 and 7. FIG. 6 illustrates a state in which the slit light is being radiated from an oblique direction relative to the jig 5 (plate-shaped member 51 and block 52). It should be noted that in FIG. 6, the projection line is illustrated with angles $\alpha$, $\beta$, and $\gamma$ greater than in reality in order to aid understanding of said angles. FIG. 7 is a display example created on the basis of the projection line measured by the area sensor 42.

In the case of the first exemplary embodiment, the area sensor 42 is arranged in a position inclined at an angle $\theta_2$ with respect to the X'-Z' plane, and captures images of the projection line from diagonally above. The distance between the projection line on the upper surface of the block 52 and the projection line on the plate-shaped member 51 captured by the area sensor 42 is thus smaller than the actual distance. Accordingly, the projection line acquiring unit 432 obtains a measured value h by correcting the abovementioned distance on the basis of the arrangement of the slit light radiating unit 41 and the area sensor 42 (the angles $\theta_1$ and $\theta_2$ relative to the X'-Z' plane) and the actually measured distance. Meanwhile, the length of the projection line on the upper surface of the block 52 is taken as the measured value w. Then, the measured values w, h are displayed on the display unit 46, as illustrated in FIG. 7.

Here, as illustrated in FIGS. 6 and 7, an angle between a straight line that passes through one end of the projection line on the upper surface of the block 52 (if the projection line on the side surface of the block 52 is also imaged, the bending point of the projection line) and that is parallel to the Z'-axis of the measuring instrument coordinate system and a straight line that passes through said end and that is parallel to the Z-axis of the operating space coordinate system is defined as $\alpha$, an angle between one direction (lateral direction) of the angle of view of the area sensor 42 and the projection line captured by the area sensor 42 is defined as β, and an angle between the projection line on the upper surface of the block 52 and a straight line that passes through one end of the projection line and that is parallel to the X-axis of the operating space coordinate system is defined as γ.

If the angles α, β, and γ are defined as described above, the angles α and γ are found using the following equations, from the length W of the block 52 in the X-axis direction and the length H thereof in the Z-axis direction.

$$\alpha = \cos^{-1}(H/h) \quad (1)$$

$$\gamma = \cos^{-1}(W/w) \quad (2)$$

Further, the angle β is found as the angle between the lateral direction of the angle of view of the area sensor 42 and the projection line on the plate-shaped member 51, as described hereinabove.

The measuring instrument attitude calculating unit 433 calculates the angles α, β, and γ from the projection line profile, as described hereinabove (step 7), and displays each angle on a screen of the display unit 46.

Having calculated the angles α, β, and γ, the measuring instrument attitude calculating unit 433 determines whether the values are all at most equal to a predetermined value (prescribed value) (step 8). The prescribed value is set to a value with which it can be regarded that the axes of the operating space coordinate system and the axes of the measuring instrument coordinate system are essentially parallel to one another. The prescribed value is 0.2 degrees, for example. If the angles α, β, and γ are all at most equal to the prescribed value (YES in step 8), the process proceeds to step 10 discussed hereinafter.

However, if any angle exceeds the prescribed value (NO in step 8), the user adjusts the attitude of the three-dimensional sensor 4 using the controller 3 (step 9). The process then returns to step 5, slit light is once again radiated onto the block 52, the angles α, β, and γ are calculated and displayed on the display unit 46, and it is determined whether the angles are all at most equal to the prescribed value (steps 5 to 8). These processes are repeated until the angles α, β, and γ are all at most equal to the prescribed value. In the first exemplary embodiment, since the values of the angles α, β, and γ are displayed on the display unit 46 each time the angles are calculated, the user can check the angles α, β, and γ, and can intuitively ascertain the extent of deviation between the measuring instrument coordinates and the operating space coordinates. Further, while checking the changes in the values, the user can also determine the degree to which the coordinates must be made to coincide, in consideration of the accuracy required of the work to be carried out using the robot 2, for example.

When the angles α, β, and γ are all at most equal to the prescribed value (YES in step 8), the coordinate system shifting unit 434 acquires the three-dimensional measurement data for the entire block 52 by scanning the slit light from the three-dimensional sensor in the Y'-axis direction (essentially the same as the Y-axis direction since the operating space coordinate system and the measuring instrument coordinate system are parallel to one another), and finds the coordinate position, in the measuring instrument coordinate system, of a prescribed position on the block 52 (for example, the center of the bottom surface of the block 52 positioned on the X-Y plane in the operating space coordinate system) (step 10). Said position is then compared with the coordinate position of the prescribed position on the block 52 in the operating space coordinate system, to find a difference (shift amount) (step 11). Finally, the measuring instrument coordinate system is shifted by the magnitude of the shift amount, thereby causing the measuring instrument coordinate system and the operating space coordinate system to coincide.

Second Exemplary Embodiment

A second exemplary embodiment will now be described. As illustrated in FIG. 8, a robot system 100 in the second exemplary embodiment is provided with a control/processing device 6, in addition to the configuration of the alignment system 1 in the first exemplary embodiment. The control/processing device 6 is provided in such a way as to be capable of communicating with the robot 2, the three-dimensional sensor 4, and the controller 3.

As illustrated in FIG. 9, the control/processing device 6 is provided with a storage unit 61, and also, as functional blocks, with a displacement acquiring unit 621, a transformation matrix creating unit 622, a three-dimensional measurement data acquiring unit 623, and a three-dimensional measurement data integrating unit 624. The substance of the control/processing device 6 consists of a generic personal computer, for example, and the abovementioned functional blocks are embodied by executing a pre-installed three-dimensional measurement data processing program 62. Here, the configuration is such that the control/processing unit 43 of the three-dimensional sensor 4 and the control/processing device 6 are each provided, but it is also possible to adopt a configuration in which some or all of the functions of the control/processing unit 43 of the three-dimensional sensor 4 are incorporated into the control/processing device 6.

The operations of each part and the data processing flow in the second exemplary embodiment will be described with reference to the flowchart in FIG. 10. Descriptions of operations and processes that are common with the first exemplary embodiment are omitted as appropriate.

In the first exemplary embodiment, one position and attitude of the three-dimensional sensor 4 are set with respect to one operating space coordinate system, and measurement data are acquired in the three dimensions of the target object with said position and attitude. Therefore, if the target object has a three-dimensional shape, parts on the opposite side of the target object to the three-dimensional sensor 4 are in shadow and cannot be measured three-dimensionally.

Accordingly, in the second exemplary embodiment, the user first sets a plurality of operating space coordinate systems corresponding to the attitude of the robot 2, using the same procedure as in the first exemplary embodiment. The plurality of operating space coordinate systems are set in such a way that the parts in shadow in the three-dimensional measurement in the first exemplary embodiment can also be measured three-dimensionally. Then, one of the plurality of operating space coordinate systems is defined as a standard operating space coordinate system, and the other operating space coordinate systems are defined as reference operating space coordinate systems (step 21). An example will now be described in which two reference operating space coordinate systems (first reference operating space coordinate system and second reference operating space coordinate system) are set. Hereinafter, the standard operating space coordinate system is denoted by $\Sigma_A$, the first reference operating space coordinate system is denoted by $\Sigma_B$, and the second reference operating space coordinate system is denoted by $\Sigma_C$. There may be one reference operating space coordinate system, or there may be three or more.

Next, the position and attitude of the three-dimensional sensor 4 are determined for each of the standard operating space coordinate system $\Sigma_A$, the first reference operating space coordinate system $\Sigma_B$, and the second reference operating space coordinate system $\Sigma_C$ using the same procedure as in the first exemplary embodiment (step 22).

In relation to points existing in the three-dimensional spaces in which the standard operating space coordinate system and the reference operating space coordinate systems are set, the relationship between a position vector $^Br$ represented in the coordinate system $\Sigma_B$ and a position vector $^Ar$ represented in the coordinate system $\Sigma_A$ is expressed by the following formula.

$$\begin{bmatrix} ^Ar \\ 1 \end{bmatrix} = {^AT_B} \begin{bmatrix} ^Br \\ 1 \end{bmatrix} \quad \text{[Formula 1]}$$

Here, $^AT_B$ is a homogeneous transformation matrix that can be expressed by the following matrix, which includes a rotational transformation $^AR_B$ and a translation $^AP_B$ as elements.

$$^AT_B = \begin{bmatrix} ^AR_B & ^AP_B \\ 0 & 1 \end{bmatrix} \quad \text{[Formula 2]}$$

The position and attitude of the origin of the coordinate system $\Sigma_B$ in the coordinate system $\Sigma_A$ should be found in order to find the matrix elements of this homogeneous transformation matrix.

More specifically, using the displacement acquiring unit 621, the operating point 20 of the robot 2 is set to the origin ($x_A=0$, $y_A=0$, $z_A=0$, $r_{xA}=0$, $r_{yA}=0$, $r_{zA}=0$) of the standard operating space coordinate system $\Sigma_A$, and the operating point 20 is then moved to the origin ($x_B=0$, $y_B=0$, $z_B=0$, $r_{xB}=0$, $r_{yB}=0$, $r_{zB}=0$) of the reference operating space coordinate system $\Sigma_B$ (step 23). The translational displacement and the rotational displacement in the standard operating space coordinate system $\Sigma_A$ when the operating point 20 is at the origin of the reference operating space coordinate system $\Sigma_B$ are then acquired. These can be read from the controller 3 that controls the operation of the robot 2. The transformation matrix creating unit 622 creates the homogeneous transformation matrix $^AT_B$ on the basis of the translational displacement and the rotational displacement (step 24). The homogeneous transformation matrix $^AT_B$ transforms coordinates in the reference operating space coordinate system $\Sigma_B$ into coordinates in the standard operating space coordinate system $\Sigma_A$.

A homogeneous transformation matrix $^AT_C$ for transforming the second reference operating space coordinate system $\Sigma_C$ into the standard operating space coordinate system $\Sigma_A$ is obtained by performing the same processing for the second reference operating space coordinate system $\Sigma_C$.

The three-dimensional measurement data acquiring unit 623 acquires the three-dimensional measurement data for the target object in each of the standard operating space coordinate system $\Sigma_A$, the first reference operating space coordinate system $\Sigma_B$, and the second reference operating space coordinate system $\Sigma_C$ (step 25). The three-dimensional measurement data integrating unit 624 then uses the homogeneous transformation matrices $^AT_B$ and $^AT_C$ to transform the three-dimensional measurement data for the target object in the first reference operating space coordinate system $\Sigma_B$ and the second reference operating space coordinate system $\Sigma_C$ respectively into three-dimensional measurement data in the standard operating space coordinate system $\Sigma_A$ (step 26. FIG. 11). The three-dimensional measurement data integrating unit 624 integrates the three-dimensional measurement data for the target object in the standard operating space coordinate system $\Sigma_A$ obtained in this way with the three-dimensional measurement data for the target object acquired in the standard operating space coordinate system $\Sigma_A$ (step 27), and displays the result on a screen of a display unit 66 (step 28). By means of appropriate manipulations performed using an input unit 65, the user can, for example, rotate the three-dimensional measurement data relating to the target object displayed on the screen of the display unit 66, to check the shape of the target object from any direction.

FIG. 12 shows the results of integrating the three-dimensional measurement data for a target object acquired by means of the three-dimensional sensor 4 with positions and attitudes corresponding to each of three different operating space coordinate systems. FIG. 12(a) is an optical image of the target object, and FIG. 12(b) is the result of integrating the three-dimensional measurement data for the target object acquired in the three different coordinate systems. In the second exemplary embodiment, it is simple to integrate the three sets of three-dimensional measurement data acquired using the three-dimensional sensor 4 with positions and attitudes corresponding to the different operating space coordinate systems, merely by moving the operating point 20 of the robot 2 between the origin of the standard operating space coordinate system and the origins of the reference operating space coordinate systems to acquire the translational displacements and the rotational displacements, and finding the transformation matrices for transforming the reference operating space coordinate systems into the standard operating space coordinate systems on the basis of said displacements.

The techniques disclosed in patent literature articles 2 to 4, for example, have been proposed as conventional techniques for processing the three-dimensional measurement data. However, with these methods, the resolution of the three-dimensional measurement data may deteriorate as a result of shear deformation or scaling, for example. Further, with these techniques, it is necessary to perform a complex calculation to find the elements of the homogeneous transformation matrix when data integration is to be performed, such as, for example, finding the coordinate values of a plurality of positions, separately from the robot operating space coordinate system, and obtaining the homogeneous transformation matrix from said coordinate values. However, it is difficult for an operator to perform such advanced arithmetic processing at a work site such as a factory in which many robot systems are used.

In contrast, in the second exemplary embodiment, the operating space coordinate system is set using the alignment jig 5, in the same way as in the first exemplary embodiment. Therefore, unlike in patent literature articles 2 to 4, shear deformation and scaling do not occur, and the three-dimensional measurement data can be easily integrated while maintaining a high resolution and accuracy.

Third Exemplary Embodiment

A third exemplary embodiment will now be described. As illustrated in FIG. 13, a robot system 200 in the third exemplary embodiment is provided with a plurality of robots 2a, 2b, controllers 3a, 3b for controlling the operations of the robots 2a, 2b, and a control/processing device 7. The robots 2a, 2b and the controllers 3a, 3b have the same configuration as the robot 2 and the controller 3 in the first exemplary embodiment and the second exemplary embodiment. Further, the control/processing device 7 has the same configuration and functional blocks as the control/processing device 6 in the second exemplary embodiment. Here, although the configuration assumes that two robots are provided, in order to simplify the description, the system may be provided with three or more robots 2.

The range of movement of the operating point 20 of the robot 2 in the second exemplary embodiment is determined by the length of the linear motion mechanisms 22a to 22c that move the arm unit 21, and if the target object is large with respect to the robot 2, the arm may not reach the opposite side of the target object using only one robot 2, so it may not be possible to acquire the three-dimensional measurement data for a portion of the target object. Further, with a system employing only one robot 2, the three-dimensional measurement data for the target object cannot be obtained simultaneously from a plurality of directions.

Accordingly, in the third exemplary embodiment the three-dimensional measurement data for the target object are acquired using a plurality of robots 2. The operations of each part and the data processing flow in the third exemplary embodiment will be described with reference to the flowchart in FIG. 14. Descriptions of operations and processes that are common with the first exemplary embodiment and the second exemplary embodiment are omitted as appropriate.

First, a linked operating space coordinate system $\Sigma_A$ and a reference operating space coordinate system $\Sigma_B$ are set for the robot 2a. Further, the linked operating space coordinate system $\Sigma_A$ and a reference operating space coordinate system $\Sigma_C$ are set for the robot 2b. In other words, the linked operating space coordinate system common to the plurality of robots 2 is set, and reference operating space coordinate systems unique to each robot 2 are set (step 31. See FIG. 15). The linked operating space coordinate system $\Sigma_A$ corresponds to the standard operating space coordinate system in the third aspect and the sixth aspect of the present invention. It should be noted that the linked operating space coordinate system $\Sigma_A$ and the reference operating space coordinate system $\Sigma_B$ may be the same coordinate system for any one robot.

Next, the position and attitude of the three-dimensional sensor 4 are determined in each operating space coordinate system using the same procedure as in the first exemplary embodiment (step 32).

Further, homogeneous transformation matrices for transforming the reference operating space coordinate systems $\Sigma_B$, $\Sigma_C$ set for each robot 2a, 2b into the linked operating space coordinate system $\Sigma_A$ are found using the same procedure as in the second exemplary embodiment (step 33).

The three-dimensional measurement data for the target object are then acquired in the respective reference operating space coordinate systems $\Sigma_B$, $\Sigma_C$ for each of the robots 2a, 2b (step 34). The homogeneous transformation matrices $^AT_B$ and $^AT_C$ are then used to transform the three-dimensional measurement data for the target object in the reference operating space coordinate systems $\Sigma_B$ and $\Sigma_C$ respectively into three-dimensional measurement data in the linked operating space coordinate system $\Sigma_A$ (step 35. FIG. 15). In this way, the three-dimensional measurement data for the target object, acquired using the three-dimensional sensors 4 attached to the different robots 2a, 2b, can be integrated with the three-dimensional measurement data for the target object in the linked operating space coordinate system $\Sigma_A$ (step 36). The integrated data are displayed on the screen of the display unit 66 (step 37).

In the third exemplary embodiment, since the plurality of robots 2a, 2b are used, the three-dimensional measurement data for an entire large target object can be acquired without being constrained by the length of the arm of the robot 2. Further, the three-dimensional measurement data for the target object can be obtained simultaneously from a plurality of directions.

Although in the above description the linked operating space coordinate system $\Sigma_A$ common to the two robots 2 was set, it may be difficult to set a common linked operating space coordinate system for all the robots 2 if a target object that is being conveyed is measured using three-dimensional sensors 4 attached to multiple robots 2. In such a case, a plurality of operating space coordinate systems, of which one is common with the operating space coordinate system set for at least one other robot, may be set for each of the plurality of robots 2.

FIG. 16 illustrates a robot system 300 in a modified example of the third exemplary embodiment. In this robot system 300, a target object 9 being conveyed by a belt conveyor 8 is monitored. A plurality of robots 2a, 2b . . . are arranged in the conveying direction of the target object 9 on one side of the belt conveyor 8, and a plurality of robots 2e, 2f are also arranged on the other side thereof.

Only the standard operating space coordinate system $\Sigma_A$ is set for the robot 2a. Further, the linked operating space coordinate system $\Sigma_A$ and the reference operating space coordinate system $\Sigma_B$ are set for the robot 2b. For the robot 2c and below, a linked operating space coordinate system common with the adjacent robot 2 and a reference operating space coordinate system are set. Further, for the robot 2e positioned on the opposite side of the belt conveyor 8 to the robot 2a, the linked operating space coordinate system $\Sigma_A$ and a reference operating space coordinate system $\Sigma_E$ are set. For the robot 2f and below, a linked operating space coordinate system common with the adjacent robot 2 and a reference operating space coordinate system are set.

As described in the third exemplary embodiment, the coordinate systems can be transformed into one another using the corresponding homogeneous transformation matrices. For example, as illustrated in FIG. 16, the three-dimensional measurement data acquired in the reference operating space coordinate system $\Sigma_F$ of the robot 2f can be transformed into three-dimensional measurement data in the standard operating space coordinate system $\Sigma_A$ by performing transformations sequentially using two homogeneous transformation matrices $^ET_F$ and $^AT_E$. In this way, in the system 300 in the modified example, the three-dimensional measurement data relating to the target object 9 acquired by all the reference operating space coordinate systems are transformed into three-dimensional measurement data in the standard operating space coordinate system $\Sigma_A$ using one to a plurality of homogeneous transformation matrices, and are combined. This makes it possible for the target object 9 which is moving by being conveyed, for example, to be monitored over a wide range.

The specific configurations and numerical values described in the above exemplary embodiments are all examples, and can be changed as appropriate in accordance with the gist of the present invention.

In the exemplary embodiments, the shift amount for the two coordinate systems is found using the jig 5, and processing is performed as far as the step of shifting the two coordinate systems to cause the same to coincide, but these processes are not essential. For example, when actually operating the robot, processing to add (or subtract) the shift amount to (or from) the position acquired in the measuring instrument coordinate system to transform said position into the position in the operating space coordinate system may be performed each time the robot is actually operated. Alternatively, after the three axes of the operating space coordinate system and the three axes of the measuring instrument coordinate system have been made parallel to one another, a separate jig can be arranged, and the shift amount found from the difference between the coordinates of a prescribed position of the jig in each of the operating space coordinate system and the measuring instrument coordinate system. The jig used to find the shift amount does not necessarily need to be a rectangular cuboid, and an appropriately shaped jig with which it is possible to define the prescribed position can be used. For example, if it is difficult for the shape of the edge part to be measured accurately when acquiring the entire profile of the rectangular cuboid block 52, it is preferable to use a cylindrical block. Further, the jig used to calculate the shift amount is not limited to a block, and it is possible to use a suitable jig which includes a prescribed position having known coordinates (for example, the center positioned on the X-Y plane and the height from said center), and of which it is possible to acquire three-dimensional measurement data using the three-dimensional sensor 4.

INDUSTRIAL APPLICABILITY

At present, due to the declining population, there is an urgent need to broaden the use of robots in manufacturing sites to replace human power. However, integration of systems employing robots and three-dimensional measuring instruments requires advanced knowledge, and is therefore not always easy for site workers to perform. In particular, in the automobile industry in which robots manufactured by various robot manufacturers are used, the operability differs depending on the robot manufacturer, and in some cases it is necessary to dispatch a specialist engineer who is familiar with the operation, making it difficult to secure and develop human resources. For example, an unexpected collision or the like may occur when a robot is being used, causing the attachment position of the three-dimensional measuring instrument to become displaced. Since rapid recovery is required at the worksite, there is a need for an alignment technique that is applicable in common to robots manufactured by various robot manufacturers, without advanced knowledge, and thus the present invention can be preferably employed.

With the spread of industrial robots and advances in sensing technology of cameras and the like used to control industrial robots, there is an increasing need for various types of three-dimensional data to be acquired accurately, including not only the external appearance but also the internal appearance of a target object, with the aim of carrying out appearance inspections and reverse engineering, for example. Further, the size of target objects is increasing, and there are even requirements to scan entire trains or automobiles. However, in systems obtained by upgrading conventional techniques without modification, processes such as arithmetic processing are becoming increasingly complex, and it is becoming difficult for such systems to be handled by persons other than engineers well acquainted not only with robots but also with technology such as programming relating to three-dimensional measurement.

With the second exemplary embodiment and the third exemplary embodiment, unlike in the past, complex calculation programs are not required to integrate the three-dimensional measurement data relating to the target object obtained by means of a light sectioning method employing a measuring instrument such as a three-dimensional sensor attached to the robot, and three-dimensional measurement data acquired with different coordinate systems can be integrated by an operator using a simple process.

EXPLANATION OF THE REFERENCE NUMBERS

1, 100, 200, 300 . . . robot system
2 . . . robot
20 . . . operating point
21 . . . arm unit
22a to 22c . . . linear motion mechanism
23a to 23c . . . rotation mechanism
3 . . . controller
31 . . . operating space coordinate system setting unit
4 . . . three-dimensional sensor
41 . . . slit light radiating unit
42 . . . area sensor
43 . . . control/processing unit
431 . . . storage unit
432 . . . projection line acquiring unit
433 . . . measuring instrument attitude calculating unit
44 . . . communication interface
45 . . . input unit
46 . . . display unit
5 . . . jig
51 . . . plate-shaped member
52 . . . block
6, 7 . . . control/processing device
61 . . . storage unit
62 . . . three-dimensional measurement data processing program
621 . . . displacement acquiring unit
622 . . . transformation matrix creating unit
623 . . . three-dimensional measurement data acquiring unit
624 . . . three-dimensional measurement data integrating unit
65 . . . input unit
66 . . . display unit

The invention claimed is:
1. A method for aligning a robot coordinate system, being a coordinate system of a robot for moving an operating point three-dimensionally, and a measuring instrument coordinate system, being a coordinate system of a three-dimensional measuring instrument which is capable of executing a light sectioning method and of which a position and attitude with respect to the operating point are unchanging, characterized by including the steps of:
determining a relationship between an operating space coordinate system, being a coordinate system of an operating space of the operating point, and the robot coordinate system, by moving the operating point to a first reference point positioned at an origin of the operating space coordinate system, and a second reference point and a third reference point positioned respectively on two straight lines that intersect at right angles at the first reference point, and teaching the position of each reference point;

radiating sheet-like slit light from the three-dimensional measuring instrument onto a reference object in the shape of a rectangular cuboid which is fixed, in such a way that the edges thereof are parallel to each of three orthogonal axes defining the operating space coordinate system, onto a surface of a plate-shaped member disposed parallel to a plane on which two of the three orthogonal axes are located, and acquiring a projection line on the reference object resulting from the slit light;

finding the attitude of the three-dimensional measuring instrument relative to the reference object on the basis of a profile of the projection line, the projection line profile includes the length of the projection line on the upper surface of the reference object, the distance between the projection line on the upper surface of the reference object and the projection line on a surface of the plate-shaped member, and the inclination of the projection lines relative to the coordinate axes of the three-dimensional measuring instrument;

determining whether the found attitude falls within a predetermined standard attitude range; and when the found attitude does not fall within the predetermined standard attitude range, moving the three-dimensional measuring instrument such that the attitude of the three-dimensional measuring instrument falls within the predetermined standard attitude range.

2. The coordinate system alignment method for a robot as claimed in claim 1, characterized by additionally including, after the step of moving the three-dimensional measuring instrument such that the attitude of the three-dimensional measuring instrument falls within a predetermined standard attitude range, the steps of:

comparing and finding a difference between coordinates in the operating space coordinate system and coordinates in the measuring instrument coordinate system of a predetermined position in the reference object; and shifting the measuring instrument coordinate system by said difference.

3. The coordinate system alignment method for a robot as claimed in claim 1, characterized in that, in the operating space coordinate system, the first reference point is the origin, and the second reference point and the third reference point are points on the axes of the coordinate system.

4. The coordinate system alignment method for a robot as claimed in claim 1, characterized in that the reference object is arranged in such a way that three edges of the reference object are parallel to the three axes of the operating space coordinate system.

5. The coordinate system alignment method for a robot as claimed in claim 1, characterized in that the slit light is light that has a width in one axial direction of the measuring instrument coordinate system and that is emitted in another one axial direction of the measuring instrument coordinate system.

6. The coordinate system alignment method for a robot as claimed in claim 1, characterized in that: a standard operating space coordinate system and a reference operating space coordinate system are set as the operating space coordinate system;

the operating point is moved between an origin of the standard operating space coordinate system and an origin of the reference operating space coordinate system, and a translational displacement and a rotational displacement are acquired;

a transformation matrix for transforming the reference operating space coordinate system into the standard operating space coordinate system is found on the basis of the translational displacement and the rotational displacement;

the three-dimensional measuring instrument is moved in such a way that the attitude of the three-dimensional measuring instrument falls within the predetermined standard attitude range in each of the standard operating space coordinate system and the reference operating space coordinate system, and three-dimensional measurement data relating to a target object are acquired; and the transformation matrix is employed to transform the three-dimensional measurement data relating to the target object, acquired in the reference operating space coordinate system, into three-dimensional measurement data in the standard operating space coordinate system, and said three-dimensional measurement data are integrated with the three-dimensional measurement data relating to the target object, acquired in said standard operating space coordinate system.

7. The coordinate system alignment method for a robot as claimed in claim 6, characterized in that: a plurality of said operating space coordinate systems, of which one is common with the operating space coordinate system set for at least one other robot, are set for each of a plurality of robots;

one of all the operating space coordinate systems set for the plurality of robots is defined as the standard operating space coordinate system, and the others are defined as reference operating space coordinate systems;

the transformation matrix for transforming the reference operating space coordinate systems into the standard operating space coordinate system, among the coordinate systems set for the plurality of robots, is created;

the three-dimensional measurement data relating to the target object are acquired in each of the plurality of operating space coordinate systems set for each of the plurality of robots; and the three-dimensional measurement data relating to the target object, acquired in the reference operating space coordinate systems, are transformed into three-dimensional measurement data in the standard operating space coordinate system, and are integrated.

8. The coordinate system alignment method for a robot as claimed in claim 7, characterized in that the standard operating space coordinate system is set for all of the plurality of robots.

9. A system for aligning a robot coordinate system, being a coordinate system of a robot for moving an operating point three-dimensionally, and a measuring instrument coordinate system, being a coordinate system of a three-dimensional measuring instrument which is capable of executing a light sectioning method and of which a position and attitude with respect to the operating point are unchanging, characterized by being provided with:

an operating space coordinate system setting unit for determining a relationship between an operating space coordinate system, being a coordinate system of an operating space of the operating point, and the robot coordinate system, by moving the operating point to a first reference point positioned at an origin of the operating space coordinate system, and a second reference point and a third reference point positioned respectively on two straight lines that intersect at right angles at the first reference point, and teaching the position of each reference point;

a projection line acquiring unit for radiating sheet-like slit light from the three- dimensional measuring instrument onto a reference object in the shape of a rectangular cuboid which is fixed, in such a way that the edges thereof are parallel to each of three orthogonal axes defining the operating space coordinate system, onto a surface of a plate-shaped member disposed parallel to a plane on which two of the three orthogonal axes are located, and acquiring a projection line on the reference object resulting from the slit light;

a measuring instrument attitude calculating unit for finding the attitude of the three- dimensional measuring instrument relative to the reference object on the basis of a profile of the projection line, the projection line profile includes the length of the projection line on the upper surface of the reference object, the distance between the projection line on the upper surface of the reference object and the projection line on a surface of the plate-shaped member, and the inclination of the projection lines relative to the coordinate axes of the three-dimensional measuring instrument;

a determining unit for determining whether the found attitude falls within a predetermined standard attitude range; and a measuring instrument moving unit for moving the three-dimensional measuring instrument.

10. The coordinate system alignment system for a robot as claimed in claim 9, characterized in that the operating space coordinate system sets a standard operating space coordinate system and a reference operating space coordinate system as the operating space coordinate system, and the alignment system is additionally provided with:

a displacement acquiring unit for moving the operating point between an origin of the standard operating space coordinate system and an origin of the reference operating space coordinate system, and acquiring a translational displacement and a rotational displacement;

a transformation matrix calculating unit for finding, on the basis of the translational displacement and the rotational displacement, a transformation matrix for transforming the reference operating space coordinate system into the standard operating space coordinate system;

a three-dimensional measurement data acquiring unit for moving the three-dimensional measuring instrument in such a way that the attitude of the three-dimensional measuring instrument falls within the predetermined standard attitude range in each of the standard operating space coordinate system and the reference operating space coordinate system, and acquiring three-dimensional measurement data relating to a target object; and a three-dimensional measurement data integrating unit for employing the transformation matrix to transform the three-dimensional measurement data relating to the target object, acquired in the reference operating space coordinate system, into three-dimensional measurement data in the standard operating space coordinate system, and integrating said three-dimensional measurement data with the three-dimensional measurement data relating to the target object, acquired in said standard operating space coordinate system.

11. The coordinate system alignment system for a robot as claimed in claim 10, characterized by being additionally provided with a plurality of robots, wherein:

the operating space coordinate system setting unit sets a plurality of said operating space coordinate systems, of which one is common with the operating space coordinate system set for at least one other robot, for each of the plurality of robots, sets one of all the operating space coordinate systems set for the plurality of robots as the standard operating space coordinate system, and sets the others as reference operating space coordinate systems;

the transformation matrix calculating unit creates the transformation matrices for transforming the reference operating space coordinate systems into the standard operating space coordinate system, among the coordinate systems set for the plurality of robots;

the three-dimensional measurement data integrating unit acquires the three-dimensional measurement data relating to the target object in each of the plurality of operating space coordinate systems set for each of the plurality of robots; and the three-dimensional measurement data integrating unit transforms the three-dimensional measurement data relating to the target object, acquired in the reference operating space coordinate systems, into three-dimensional measurement data in the standard operating space coordinate system, and integrates the same.

12. A robot coordinate alignment device, which is a device used to align an operating space coordinate system, being a coordinate system of an operating space of an operating point associated in advance with a robot coordinate system, being a coordinate system of a robot for moving the operating point three-dimensionally, and a measuring instrument coordinate system, being a coordinate system of a three-dimensional measuring instrument which is capable of executing a light sectioning method and of which a position and attitude with respect to the operating point are unchanging, characterized by being provided with:

a projection line acquiring unit for radiating sheet-like slit light from the three-dimensional measuring instrument onto a reference object in the shape of a rectangular cuboid which is fixed, in such a way that the edges thereof are parallel to each of three orthogonal axes defining the operating space coordinate system, onto a surface of a plate-shaped member disposed parallel to a plane on which two of the three orthogonal axes are located, and acquiring a projection line on the reference object resulting from the slit light; and a measuring instrument attitude calculating unit for finding the attitude of the three-dimensional measuring instrument relative to the reference object on the basis of a profile of the projection line.

13. The coordinate system alignment device for a robot as claimed in claim 12, characterized by being additionally provided with a coordinate system shifting unit for comparing and finding a difference between coordinates in the operating space coordinate system and coordinates in the measuring instrument coordinate system of a predetermined position in the reference object, and shifting the measuring instrument coordinate system by said difference.

14. The coordinate system alignment device for a robot as claimed in claim 12, characterized by being additionally provided with a display unit for displaying the attitude of the three-dimensional measuring instrument relative to the reference object each time the attitude of the three-dimensional measuring instrument is found by the measuring instrument attitude calculating unit.

15. A method for aligning a robot coordinate system, being a coordinate system of a robot for moving an operating point three-dimensionally, and a measuring instrument coordinate system, being a coordinate system of a three-dimensional measuring instrument which is capable of executing a light sectioning method and of which a position and attitude with respect to the operating point are unchanging, characterized by including the steps of:

determining a relationship between an operating space coordinate system, being a coordinate system of an operating space of the operating point, and the robot coordinate system, by moving the operating point to a first reference point positioned at an origin of the operating space coordinate system, and a second reference point and a third reference point positioned respectively on two straight lines that intersect at right angles at the first reference point, and teaching the position of each reference point;

radiating sheet-like slit light from the three-dimensional measuring instrument onto a reference object in the shape of a rectangular cuboid which is fixed, in such a way that the edges thereof are parallel to each of three orthogonal axes defining the operating space coordinate system, onto a surface of a plate-shaped member disposed parallel to a plane on which two of the three orthogonal axes are located, and acquiring a projection line on the reference object resulting from the slit light;

finding the attitude of the three-dimensional measuring instrument relative to the reference object on the basis of a profile of the projection line; and moving the three-dimensional measuring instrument such that the attitude of the three- dimensional measuring instrument falls within a predetermined standard attitude range, wherein a standard operating space coordinate system and a reference operating space coordinate system are set as the operating space coordinate system, wherein the operating point is moved between an origin of the standard operating space coordinate system and an origin of the reference operating space coordinate system, and a translational displacement and a rotational displacement are acquired, wherein a transformation matrix for transforming the reference operating space coordinate system into the standard operating space coordinate system is found on the basis of the translational displacement and the rotational displacement, wherein the three-dimensional measuring instrument is moved in such a way that the attitude of the three-dimensional measuring instrument falls within the predetermined standard attitude range in each of the standard operating space coordinate system and the reference operating space coordinate system, and three-dimensional measurement data relating to a target object are acquired, wherein the transformation matrix is employed to transform the three-dimensional measurement data relating to the target object, acquired in the reference operating space coordinate system, into three-dimensional measurement data in the standard operating space coordinate system, and said three-dimensional measurement data are integrated with the three-dimensional measurement data relating to the target object, acquired in said standard operating space coordinate system, wherein a plurality of said operating space coordinate systems, of which one is common with the operating space coordinate system set for at least one other robot, are set for each of a plurality of robots, wherein one of all the operating space coordinate systems set for the plurality of robots is defined as the standard operating space coordinate system, and the others are defined as reference operating space coordinate systems, wherein the transformation matrix for transforming the reference operating space coordinate systems into the standard operating space coordinate system, among the coordinate systems set for the plurality of robots, is created, wherein the three-dimensional measurement data relating to the target object are acquired in each of the plurality of operating space coordinate systems set for each of the plurality of robots, wherein the three-dimensional measurement data relating to the target object, acquired in the reference operating space coordinate systems, are transformed into three-dimensional measurement data in the standard operating space coordinate system, and are integrated, and wherein the standard operating space coordinate system is set for all of the plurality of robots.

* * * * *